United States Patent
Ikeda et al.

(10) Patent No.: US 10,322,535 B2
(45) Date of Patent: Jun. 18, 2019

(54) METHOD OF MANUFACTURING COMPOSITE MOLDED BODY

(71) Applicants: DAICEL POLYMER LTD., Minato-ku, Tokyo (JP); DAICEL CORPORATION, Osaka-shi, Osaka (JP)

(72) Inventors: Daiji Ikeda, Himeji (JP); Yoshihiro Asami, Himeji (JP)

(73) Assignees: DAICEL POLYMER LTD., Minato-Ku, Tokyo (JP); DAICEL CORPORATION, Osaka-Shi, Osaka (JP)

(*) Notice: Subject to any disclaimer, the term of this patent is extended or adjusted under 35 U.S.C. 154(b) by 449 days.

(21) Appl. No.: 14/778,422

(22) PCT Filed: Mar. 20, 2014

(86) PCT No.: PCT/JP2014/057837
§ 371 (c)(1),
(2) Date: Sep. 18, 2015

(87) PCT Pub. No.: WO2014/156989
PCT Pub. Date: Oct. 2, 2014

(65) Prior Publication Data
US 2016/0046050 A1    Feb. 18, 2016

(30) Foreign Application Priority Data

Mar. 26, 2013 (JP) .................. 2013-063670
Jul. 18, 2013 (JP) .................. 2013-149092
(Continued)

(51) Int. Cl.
B29C 45/14    (2006.01)
B23K 26/352    (2014.01)
(Continued)

(52) U.S. Cl.
CPC .... B29C 45/14311 (2013.01); B23K 26/0006 (2013.01); B23K 26/0093 (2013.01);
(Continued)

(58) Field of Classification Search
USPC ................... 219/888.043, 888.044
See application file for complete search history.

(56) References Cited

U.S. PATENT DOCUMENTS 4,861,407 A * 8/1989 Volkmann ............... B29C 59/16
156/153
6,769,962 B2    8/2004 Kinbara et al.
(Continued)

FOREIGN PATENT DOCUMENTS

CN         1222585 A      7/1999
CN       101254138 A      9/2008
(Continued)

OTHER PUBLICATIONS

Chinese Office Action for corresponding application 201480018360.2, dated Oct. 10, 2016 (9 pages).
(Continued)

Primary Examiner — Jeffrey M Wollschlager
Assistant Examiner — Armand Melendez
(74) Attorney, Agent, or Firm — Flynn Thiel, P.C.

(57) ABSTRACT

There is provided a method of manufacturing a composite molded body that can increase a processing speed and a joining strength in a different direction. The method of manufacturing a composite molded body in which a metal molded body and a resin molded body are joined, includes the steps of: continuously irradiating a joint surface of the metal molded body with laser light at an irradiation speed of 2,000 mm/sec or more by using a continuous-wave laser; and arranging, within a mold, a portion of the metal molded body including the joint surface irradiated with the laser
(Continued)

light in the preceding step and performing injection molding of a resin forming the resin molded body, or performing compression molding in a state where a portion of the metal molded body including the joint surface irradiated with the laser light in the preceding step and a resin forming the resin molded body are made to contact with each other.

6 Claims, 18 Drawing Sheets

(30) Foreign Application Priority Data

| Dec. 24, 2013 | (JP) | ................................ 2013-264914 |
| Jan. 30, 2014 | (JP) | ................................ 2014-015162 |

(51) Int. Cl.

| B23K 26/00 | (2014.01) |
|---|---|
| B23K 26/354 | (2014.01) |
| B32B 27/08 | (2006.01) |
| B32B 15/08 | (2006.01) |
| B23K 103/10 | (2006.01) |
| B23K 103/18 | (2006.01) |
| B29K 705/00 | (2006.01) |
| B29K 77/00 | (2006.01) |
| B29K 705/02 | (2006.01) |
| B32B 15/18 | (2006.01) |
| B32B 15/20 | (2006.01) |
| B32B 27/20 | (2006.01) |
| B32B 27/30 | (2006.01) |
| B32B 27/32 | (2006.01) |
| B32B 27/34 | (2006.01) |
| B32B 27/36 | (2006.01) |
| B32B 27/38 | (2006.01) |
| B32B 27/40 | (2006.01) |
| B32B 1/08 | (2006.01) |
| B23K 103/02 | (2006.01) |
| B23K 103/04 | (2006.01) |
| B23K 103/12 | (2006.01) |
| B23K 103/08 | (2006.01) |
| B23K 103/16 | (2006.01) |
| B23K 103/00 | (2006.01) |

(52) U.S. Cl.
CPC ........ *B23K 26/354* (2015.10); *B23K 26/3584* (2018.08); *B32B 15/08* (2013.01); *B32B 27/08* (2013.01); *B23K 2103/02* (2018.08); *B23K 2103/05* (2018.08); *B23K 2103/10* (2018.08); *B23K 2103/12* (2018.08); *B23K 2103/15* (2018.08); *B23K 2103/16* (2018.08); *B23K 2103/172* (2018.08); *B23K 2103/18* (2018.08); *B23K 2103/42* (2018.08); *B29C 2045/14868* (2013.01); *B29K 2077/00* (2013.01); *B29K 2705/00* (2013.01); *B29K 2705/02* (2013.01); *B32B 1/08* (2013.01); *B32B 15/18* (2013.01); *B32B 15/20* (2013.01); *B32B 27/20* (2013.01); *B32B 27/302* (2013.01); *B32B 27/304* (2013.01); *B32B 27/32* (2013.01); *B32B 27/34* (2013.01); *B32B 27/365* (2013.01); *B32B 27/38* (2013.01); *B32B 27/40* (2013.01); *B32B 2262/02* (2013.01); *B32B 2262/0238* (2013.01); *B32B 2262/0261* (2013.01); *B32B 2262/0269* (2013.01); *B32B 2262/0276* (2013.01); *B32B 2262/04* (2013.01); *B32B 2262/062* (2013.01); *B32B 2262/065* (2013.01); *B32B 2262/10* (2013.01); *B32B 2262/103* (2013.01); *B32B 2262/106* (2013.01); *B32B 2274/00* (2013.01); *B32B 2307/538* (2013.01); *B32B 2307/54* (2013.01); *B32B 2307/542* (2013.01)

(56) References Cited

U.S. PATENT DOCUMENTS

| 7,667,158 | B2 | 2/2010 | Dance et al. |
| 7,947,145 | B2 | 5/2011 | Wang et al. |
| 8,603,585 | B2 | 12/2013 | Wang et al. |
| 2001/0023163 | A1 | 9/2001 | Kinbara et al. |
| 2002/0181224 | A1 | 12/2002 | Tahara et al. |
| 2006/0163222 | A1 | 7/2006 | Dance et al. |
| 2008/0070001 | A1 | 3/2008 | Lasarov et al. |
| 2009/0155467 | A1 | 6/2009 | Wang et al. |
| 2009/0159198 | A1 | 6/2009 | Wang et al. |
| 2009/0181239 | A1 | 7/2009 | Fan et al. |
| 2012/0207974 | A1 | 8/2012 | Maier et al. |
| 2012/0299250 | A1 | 11/2012 | Yamamoto et al. |
| 2013/0249145 | A1 | 9/2013 | Okumura et al. |
| 2013/0284711 | A1* | 10/2013 | Huang ..................... C21D 8/12 219/121.69 |

FOREIGN PATENT DOCUMENTS

| CN | 101456277 A | 6/2009 |
| CN | 101516598 A | 8/2009 |
| CN | 101633077 A | 1/2010 |
| CN | 102470636 A | 5/2012 |
| CN | 102477484 A | 5/2012 |
| CN | 103507203 A | 1/2014 |
| DE | 10 2011 077 655 A1 | 12/2012 |
| DE | 10 2011 113 246 A1 | 3/2013 |
| EP | 2 554 685 A1 | 2/2013 |
| JP | 1-101699 A | 4/1989 |
| JP | 02-094024 | 12/1991 |
| JP | 10-294024 A | 11/1998 |
| JP | 2002-82320 A | 3/2002 |
| JP | 2003-129135 A | 5/2003 |
| JP | 4020957 B2 | 10/2007 |
| JP | 2010-167475 A | 8/2010 |
| JP | 2013-052669 A | 3/2013 |
| TW | 531461 | 5/2003 |
| TW | 200404635 | 4/2004 |
| TW | 201236846 A | 9/2012 |
| TW | 201304930 A1 | 2/2013 |
| WO | WO 02/094497 A2 | 11/2002 |
| WO | WO 2006/008071 A1 | 1/2006 |
| WO | WO 2008/035150 A1 | 3/2008 |
| WO | WO 2008/069525 A1 | 6/2008 |
| WO | WO 2008/081939 A1 | 7/2008 |
| WO | WO 2009/117451 A1 | 9/2009 |
| WO | WO 2011/062153 A1 | 5/2011 |
| WO | WO 2012/073694 A1 | 6/2012 |
| WO | WO 2012/090671 A1 | 7/2012 |

OTHER PUBLICATIONS

Supplementary European Search Report for corresponding application No. EP 14 77 4519, dated Nov. 2, 2016 (12 pages).
Chinese Office Action for corresponding application No. 201480018360.2, dated Jun. 9, 2017 (7 pages).
Extended European Search Report for corresponding application No. 17175472.4, dated Aug. 9, 2017 (5 pages).
International Search Report with English translation issued in Application No. PCT/JP2014/057837 dated Jul. 8 2014 (4 pages).
Written Opinion of International Searching Authority issued in Application No. PCT/JP2014/057837 dated Jul. 8, 2014 (3 pages).
English translation of International Preliminary Report on Patentability issued in Application No. PCT/JP2014/057837 dated Sep. 29, 2015 (1 page).
English translation of Written Opinion of the International Searching Authority issued in Application No. PCT/JP2014/057837 dated Jul. 8, 2014 (4 pages).

(56) References Cited

OTHER PUBLICATIONS

Office Action of Taiwan Patent Office, dated Jul. 23, 2015 (4 pages).
Taiwan Office Action for corresponding application No. 10720213710, dated Mar. 12, 2018 (5 pgs).

* cited by examiner (a)  (b)

$a_1$: 10mm
$a_2$: 2.5mm
$a_3$: 4mm
$a_4$: 1.0mm 15.0mm 60.0mm

Example 3  Metal surface SEM photograph

Example 4  Metal surface SEM photograph

Example 5  Metal surface SEM photograph

Example 6  Metal surface SEM photograph

Metal surface SEM (Table 1, Comparative Example 2)

Press molding          100 µm

Joint surface cross section SEM

100 µm

Joint surface cross section SEM

Metal cross section SEM photograph

Table 4  Example 16

Table 4  Example 16

Table 4  Example 17

Table 4  Example 21

METHOD OF MANUFACTURING COMPOSITE MOLDED BODY

TECHNICAL FIELD

The present invention relates to a method of manufacturing a composite molded body formed of a metal molded body and a resin molded body.

BACKGROUND ART

Although resin molded bodies are used as a replacement for metals from the viewpoint of reducing the weights of various types of components, it may often be difficult to replace all metal components with resins. In such a case, it can be considered that a new composite component is manufactured by integrally joining a metal molded body and a resin molded body.

However, a technology capable of integrally joining a metal molded body and a resin molded body in an industrially advantageous manner and with a high joining strength is not commercially available.

JP-B 4020957 discloses a method of performing laser processing on a metal surface for joining different types of materials (resins) including a process of performing laser scanning on the metal surface in one scanning direction and a process of performing laser scanning in a scanning direction that crosses it.

JP-A 2010-167475 discloses a laser processing method of performing laser scanning a plurality of times further in a superimposed manner, in the invention of JP-B 4020957.

However, since in the inventions disclosed in JP-B 4020957 and JP-A 2010-167475, it is necessary to perform laser scanning in two directions crossing each other without fail, there is room for improvement in that it takes a long time to perform the processing.

Furthermore, although it is considered that sufficient surface roughening processing can be performed by the laser scanning in the crossing directions to thereby be capable of increasing the joining strength, the surface roughness state is not uniform, with the result that there exists a problem in which the directivity of the strength of the joining part of a metal and a resin may be instable.

For example, there may be generated a problem in which one jointed body has the highest shear force and tensile strength in an X axis direction, but another jointed body has the highest shear force and tensile strength in a Y axis direction different from the X axis direction, and furthermore, yet another jointed body has the highest shear force and tensile strength in a Z axis direction different from the X axis direction and the Y axis direction.

Although there are cases where a composite body of a metal and a resin having a high joining strength in a specific direction is required depending on products (for example, a rotating body component in one direction and a reciprocating component in one direction), the above-described request cannot be sufficiently met in the inventions disclosed in JP-B 4020957 and JP-A 2010-167475.

Furthermore, in the case where a joint surface has a complicated shape or a shape including a thin width part (for example, a star shape, a triangle shape or a dumbbell shape), it can also be considered that a sufficient joining strength cannot be obtained as a result of the fact that surface roughening processing is partially non-uniform by the method of performing laser scanning in the crossing directions.

JP-A 10-294024 discloses a method of manufacturing an electrical and electronic component in which a concavity and a convexity is formed by irradiating a metal surface with laser light and in which injection molding is performed on the concavity and convexity-forming site with a resin, a rubber or the like.

Embodiments 1 to 3 describe that the concavity and convexity is formed by irradiating the surface of a long metal coil with a laser. Then, paragraph [0010] describes that the surface of the long metal coil is roughened so as to be striped or satin-shaped, and paragraph [0019] discloses that the surface of the long metal coil is roughened so as to be striped, dotted, wavy, knurled or satin-shaped.

However, as described in the effects of the invention of paragraphs [0021] and [0022], the purpose of the laser irradiation is to form fine and irregular concavities and convexities in the surface of the metal to thereby enhance an anchor effect. In particular, since the long metal coil is a target to be processed, it is considered that fine and irregular concavities and convexities are inevitably formed even when any concavity and convexity are formed.

Therefore, the invention disclosed in JP-A 10-294024 discloses the same technical thought as in the invention in which laser irradiation is performed in the crossing directions to form fine concavities and convexities in the surface as in the inventions disclosed in JP-B 4020957 and JP-A 2010-167475.

WO-A1 2012/090671 discloses a method of manufacturing a composite molded body formed of a metal molded body and a resin molded body. The method includes a process of performing laser scanning so as to form straight and/or curved markings, on the joint surface of the metal molded body, in one direction or a different direction, and a process of performing laser scanning such that the straight and/or curved markings do not intersect with each other. In FIGS. 6 to 9, quadrangular, circular, oval and triangular marking patterns are shown.

SUMMARY OF THE INVENTION

Since in any method of the conventional technology, laser irradiation is performed in the form of pulse waves (non-continuous waves), the processing speed becomes disadvantageously slow.

An object of the present invention is to provide a method of manufacturing a composite molded body that can increase the processing speed and that can increase the joining strength in a different direction.

As a means for solving the problem, according to the present invention, there is provided a method of manufacturing a composite molded body in which a metal molded body and a resin molded body are joined, the method including the steps of: continuously irradiating a joint surface of the metal molded body with laser light at an irradiation speed of 2,000 mm/sec or more by using a continuous-wave laser; and arranging, within a mold, a portion of the metal molded body including the joint surface irradiated with the laser light in the preceding step and performing injection molding of a resin forming the resin molded body.

As another means for solving the problem, according to the present invention, there is provided a method of manufacturing a composite molded body in which a metal molded body and a resin molded body are joined, the method including the steps of: continuously irradiating a joint surface of the metal molded body with laser light at an irradiation speed of 2,000 mm/sec or more by using a continuous-wave laser; and arranging, within a mold, a portion of the metal molded body including the joint surface irradiated with the laser light in the preceding step and performing compression molding in a state where at least the joint surface and a resin forming the resin molded body are made to contact with each other.

According to the method of manufacturing a composite molded body of the present invention, the processing speed can be increased, consequently, the processing time can be reduced and furthermore, the joining strength of a metal molded body and a resin molded body can be increased.

DETAILED DESCRIPTION OF THE INVENTION

Figure 1:
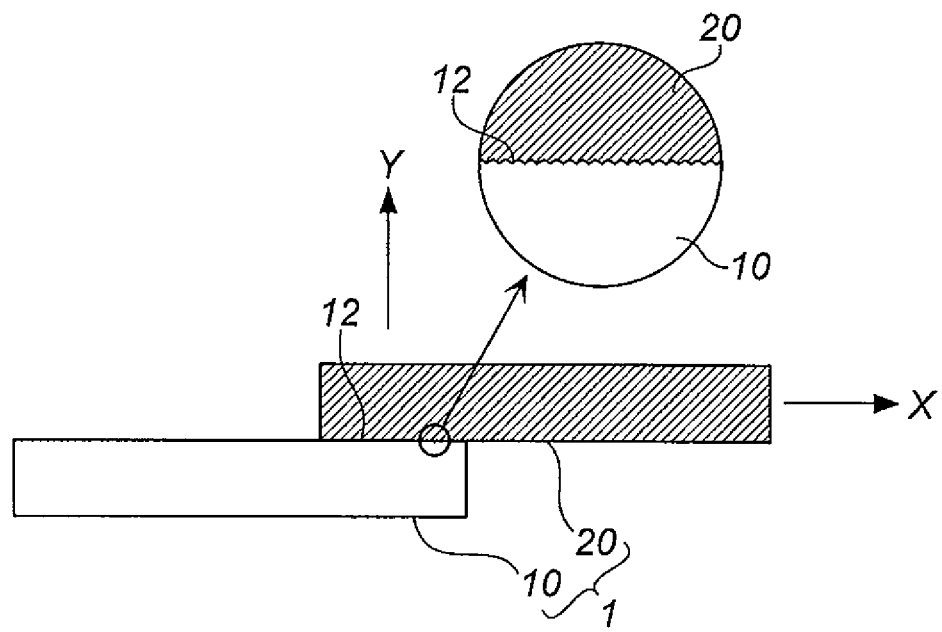
FIG. 1 is a cross-sectional view (including a partially enlarged view) of a composite molded body of the present invention in a thickness direction.

In a composite molded body 1 obtained by the manufacturing method of the present invention, a metal molded body 10 and a resin molded body 20 are joined on the joint surface 12 of the metal molded body, as shown in FIG. 1.

Hereinafter, the method of manufacturing the composite molded body 1 will be described for each process.

In the first process, laser light irradiation is continuously performed, by using a continuous-wave laser, on the joint surface 12 of the metal molded body 10 at an irradiation speed of 2,000 mm/sec or more.

In this process, the laser light irradiation is continuously performed on the joint surface 12 at a high irradiation speed, and thus it is possible to roughen the joint surface 12 in a very short period of time. In the joint surface 12 of FIG. 1

(partially enlarged view), the state of the roughened surface is illustrated in an exaggerated manner.

The irradiation speed of the continuous-wave laser is preferably 2,000 to 20,000 mm/sec, more preferably 2,000 to 18,000 mm/sec, and further preferably 2,000 to 15,000 mm/sec.

The irradiation speed of the continuous-wave laser falls within the above range, and thus it is possible to increase the processing speed (that is, it is possible to reduce the processing time), with the result that it is also possible to maintain the joint surface at a high level.

In this process, preferably, the laser light irradiation is continuously performed such that the processing time is in a range of 0.1 to 30 seconds when the following requirements (A) and (B) are satisfied:

(A) The irradiation speed of the laser light is 2,000 to 15,000 mm/sec.

(B) The area of the joint surface of the metal molded body is 100 mm$^2$.

In the case where the processing time when the requirements (A) and (B) are satisfied is made to fall within the above range, it is possible to roughen (perform roughening on) the entire joint surface 12.

Although, for example, the following method can be applied to the continuous irradiation with the laser light, the method is not particularly limited as long as a method capable of roughening the joint surface 12 is adopted.

Figure 3:
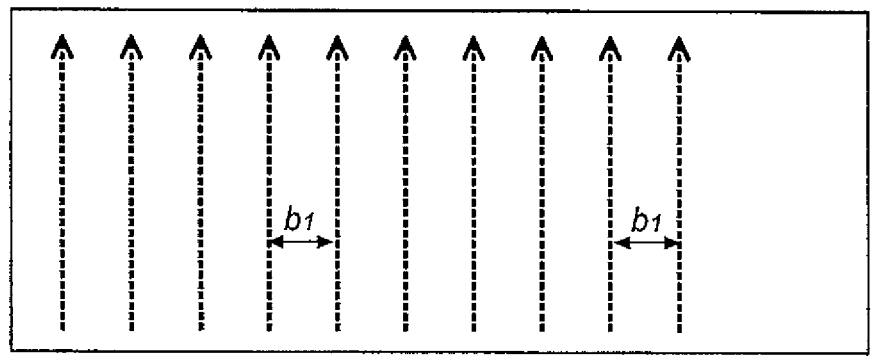
FIG. 3 is an illustrative diagram of a continuous irradiation pattern of laser light.
Figure 4:
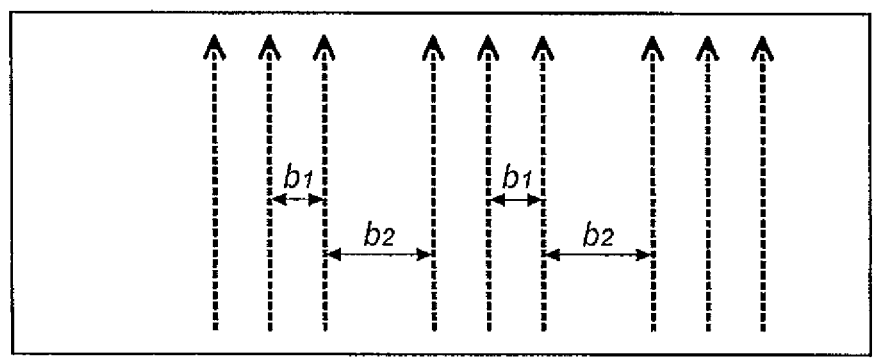
FIG. 4 is an illustrative diagram of a continuous irradiation pattern of laser light in another embodiment.

(I) A method of performing the continuous irradiation such that, as shown in FIGS. 3 and 4, one straight line or curved line is formed from the side of one-side (a short side or a long side) of the joint surface (for example, a rectangle) 12 toward the side on the opposite side, and of repeating this to thereby form a plurality of straight lines or curved lines, (II) A method of performing the continuous irradiation such that a straight line or a curved line is continuously formed from the side of one-side of the joint surface toward the side on the opposite side, and then, of repeating the continuous irradiation such that straight lines or curved lines are formed at intervals in the opposite direction, (III) A method of performing the continuous irradiation from the side of one-side of the joint surface toward the side on the opposite side, and then, performing the continuous irradiation in a direction perpendicular thereto, (IV) A method of randomly performing the continuous irradiation on the joint surface.

When the methods of (I) to (IV) are performed, one straight line or one curved line can also be formed by performing the continuous irradiation with the laser light a plurality of times.

Under the same conditions of the continuous irradiation, as the number of times (repetition times) of irradiation for forming one straight line or one curved line is increased, the degree to which the joint surface 12 is roughened becomes larger.

When, in the methods of (I) and (II), a plurality of straight lines or a plurality of curved lines is formed, it is possible to perform continuous irradiation with the laser light such that the respective straight lines or the respective curved lines are formed at equal intervals in the range of 0.005 to 1 mm (the intervals of b1 shown in FIG. 3).

The interval at this time is set larger than the beam diameter (spot diameter) of the laser light, and the number of straight lines or curved lines at this time can be adjusted in response to the area of the joint surface of the metal molded body 10.

When, in the methods of (I) and (II), a plurality of straight lines or a plurality of curved lines is formed, it is possible to perform continuous irradiation with the laser light such that the respective straight lines or the respective curved lines are formed at equal intervals in the range of 0.005 to 1 mm (the intervals of b1 shown FIGS. 3 and 4).

Then, the plurality of straight lines or the plurality of curved lines is assumed to be one group, and it is possible to form a plurality of groups.

The interval between the respective groups at this time can be set at equal intervals in the range of 0.01 to 1 mm (the interval of b2 shown in FIG. 4).

Figure 5:
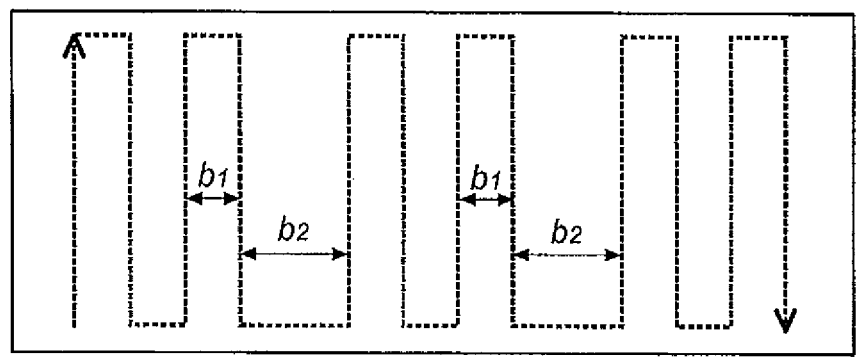
FIG. 5 is an illustrative diagram of a continuous irradiation pattern of laser light in yet another embodiment.

Note that, instead of the continuous irradiation method shown in FIGS. 3 and 4, as shown in FIG. 5, a method of performing the continuous irradiation without interruption can also be carried out during the time from the start of the continuous irradiation to the completion of the continuous irradiation.

For example, the continuous irradiation with the laser light can be performed under the following conditions.

The output is preferably 4 to 4000 W, more preferably 50 to 2500 W, further preferably 100 to 2,000 W and furthermore preferably 250 to 2,000 W.

The beam diameter (spot diameter) is preferably 5 to 200 μm, more preferably 5 to 100 μm, further preferably 10 to 100 μm and further more preferably 11 to 80 μm.

Moreover, a preferable range of a combination of the output and the spot diameter can be selected from an energy density (W/μm$^2$) determined from the laser output and a laser irradiation spot area ($\pi \times$[spot diameter/2]$^2$).

The energy density (W/μm$^2$) is preferably 0.1 W/μm$^2$ or more, more preferably 0.2 to 10 W/μm$^2$ and further preferably 0.2 to 6.0 W/μm$^2$.

When the energy density (W/μm$^2$) is the same and the output (W) is higher, a larger spot area (μm$^2$) can be irradiated with the laser, and thus the processing speed (the laser irradiation area per second: mm$^2$/sec) is increased, with the result that the processing time can be shortened.

The wavelength is preferably 300 to 1200 nm, more preferably 500 to 1200 nm.

The focus position is preferably −10 to +10 mm, more preferably −6 to +6 mm.

A preferable relationship among the irradiation speed of the continuous-wave laser, the laser output, the laser beam diameter (spot diameter) and the energy density is that the irradiation speed of the continuous-wave laser is 2,000 to 15,000 mm/sec, the laser output is 250 to 2,000 W, the laser beam diameter (spot diameter) is 10 to 100 μm and the energy density (W/μm$^2$) determined from the laser output and the spot area ($\pi \times$[spot diameter/2]$^2$) is 0.2 to 10 W/μm$^2$.

The metal of the metal molded body 10 is not particularly limited, and can be appropriately selected from known metals according to the intended use. Examples thereof can include one selected from: iron, various types of stainless steels, aluminum and alloys thereof, and copper, magnesium and alloys containing them.

Figure 2:
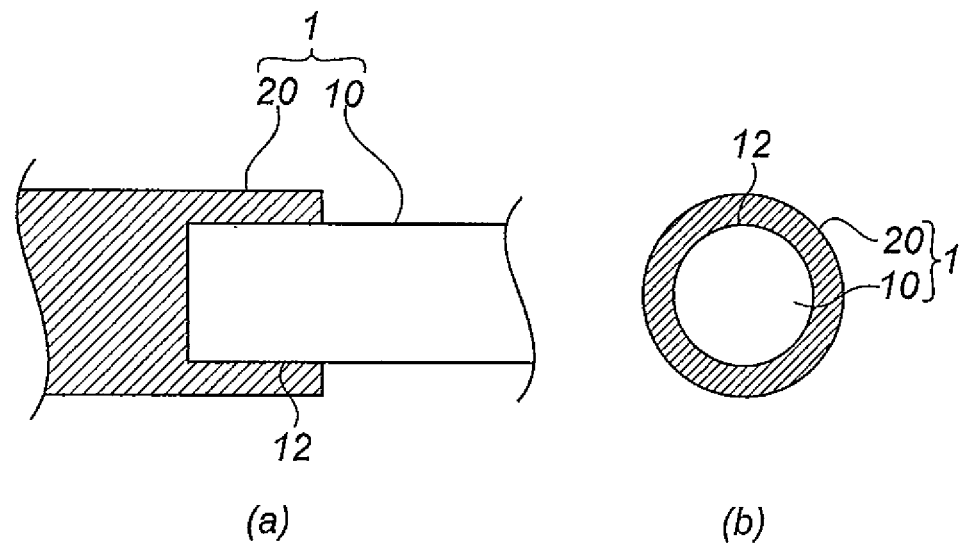
FIG. 2 is a cross-sectional view of, in a thickness direction, of a composite molded body of another embodiment of the present invention.

The joint surface 12 of the metal molded body 10 may be a flat surface as shown in FIG. 1, may be a curved surface as shown in FIG. 2 or may have both a flat surface and a curved surface.

A known continuous-wave laser can be used as the continuous-wave laser. Examples that can be used include: a YVO$_4$ laser, a fiber laser, an excimer laser, a carbon dioxide laser, an ultraviolet laser, a YAG laser, a semiconductor laser, a glass laser, a ruby laser, a He—Ne laser, a nitrogen laser, a chelate laser and a dye laser.

In the method of manufacturing the composite molded body according to the present invention, the joint surface 12 of the metal molded body is continuously irradiated with laser light by using the continuous-wave laser at an irradiation speed of 2,000 mm/sec or more, and thus the part continuously irradiated with the laser light is roughened.

At this time, one embodiment of a state of the joint surface 12 of the metal molded body at this time will be described with reference to FIGS. 6 to 8.

Figure 6:
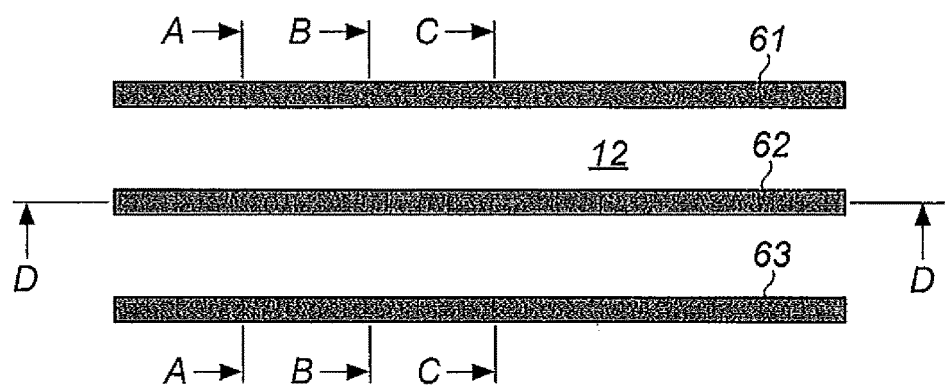
FIG. 6 is an illustrative diagram of a continuous irradiation pattern of laser light in an embodiment.

As shown in FIG. 6, irradiation with the laser light (for example, the spot diameter of 11 μm) is continuously performed to form a large number of lines (in the figure, three lines 61 to 63 are shown; the distance therebetween is approximately 50 μm), with the result that roughening is possible. The number of times one straight line is irradiated is preferably 1 to 10.

At this time, the surface-layer part of the metal molded body 10 including the roughened joint surface 12 here is shown in FIG. 7(a) and FIGS. 8(a) to 8(c). Note that the "surface-layer part of the metal molded body 10" refers to a portion from the surface to about the depth of an open hole (stem hole or branch hole) formed by the roughening.

Note that, although when the number of times one straight line is irradiated exceeds 10, it is possible to further increase the level of roughening and to enhance, in the composite molded body 1, the joining strength of the metal molded body 10 and the resin molded body 20, the total application time is increased. Accordingly, in consideration of a relationship between the joining strength of the composite molded body 1 and the manufacturing time intended, it is preferable to determine the number of times one straight line is irradiated. When the number of times one straight line is irradiated exceeds 10, the number of times preferably is 50 or less, is more preferably 15 to 40 and is further preferably 20 to 35.

Figure 7:
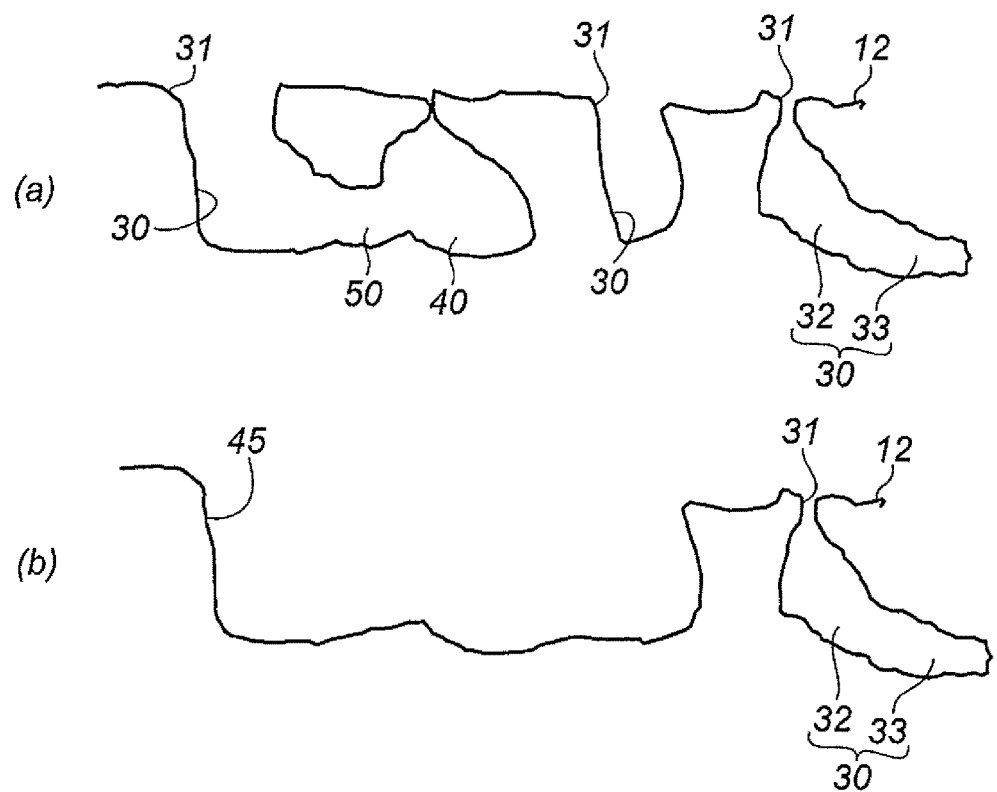
FIG. 7(a) is a cross-sectional view along line D-D when viewed from an arrow direction shown in FIG. 6.
FIG. 7(b) is a cross-sectional view of another embodiment along line D-D when viewed from an arrow direction shown in FIG. 6.
Figure 8:
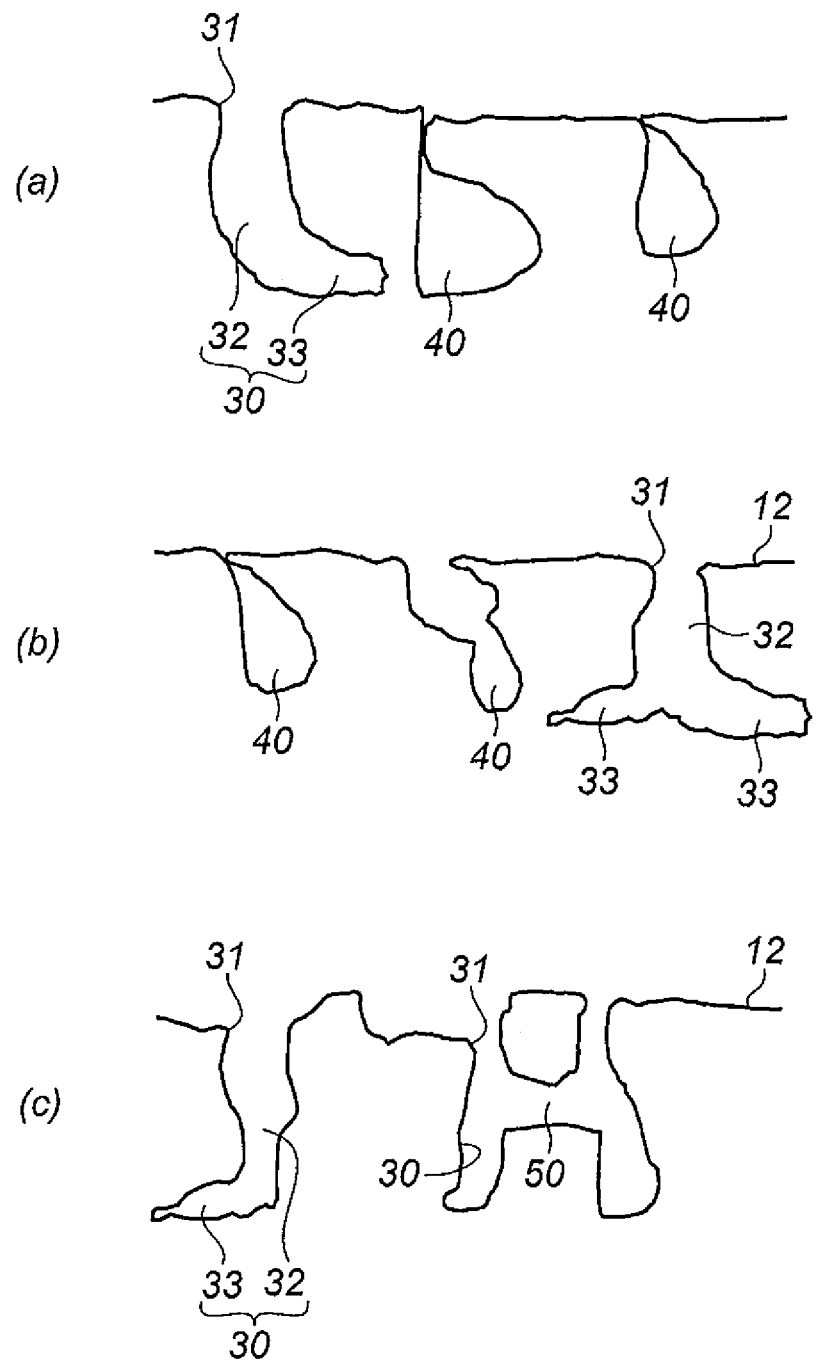
FIG. 8(a) is a cross-sectional view along line A-A when viewed from an arrow direction shown in FIG. 6.
FIG. 8(b) is a cross-sectional view along line B-B when viewed from an arrow direction shown in FIG. 6.
FIG. 8(c) is a cross-sectional view along line C-C when viewed from an arrow direction shown in FIG. 6.

As shown in FIGS. 7 and 8, the surface-layer part of the metal molded body 10 including the roughened joint surface 12 includes an open hole 30 having an open portion 31 on the side of the joint surface 12.

The open hole 30 is formed of a stem hole 32 having the open portion 31 formed in a thickness direction and a branch hole 33 formed from the inner wall surface of the stem hole 32, in a direction different from the stem hole 32. One or a plurality of branch holes 33 may be formed.

Note that, as long as the joining strength of the metal molded body 10 and the resin molded body 20 can be maintained in the composite molded body 1, a part of the open hole 30 may be formed of only the stem hole 32 and may be without the branch hole 33.

As shown in FIGS. 7 and 8, the surface-layer part of the metal molded body 10 including the roughened joint surface 12 includes an inner space 40 without the open portion on the side of the joint surface 12.

The inner space 40 is connected to the open hole 30 through a tunnel connection path 50.

As shown in FIG. 7(b), the surface-layer part of the metal molded body 10 including the roughened joint surface 12 may include an open space 45 in which a plurality of open holes 30 is formed into one, and the open space 45 may be formed by combining the open hole 30 and the inner space 40 into one. One open space 45 has an internal volume larger than one open hole 30.

Note that the open space 45 in the shape of a groove may be formed by uniting a large number of open holes 30 into one.

Although not illustrated, two inner spaces 40 as shown in FIG. 8(a) may be connected to each other through the tunnel connection path 50, or the open space 45, the open hole 30, the inner space 40 and other open spaces 45 as shown in FIG. 7(b) may be connected through the tunnel connection path 50.

Although all the inner spaces 40 are connected to one or both of the open hole 30 and the open space 45 through the tunnel connection path 50, a part of the inner spaces 40 may be a space in a closed state of not being connected to the open hole 30 and the open space 45 as long as the joining strength of the metal molded body 10 and the resin molded body 20 can be maintained in the composite molded body 1.

Although the details of how the open hole 30, the inner space 40 and the like as shown in FIGS. 7 and 8 are formed when the laser light irradiation is continuously performed as described above are not clear, it can be considered that, when the laser light irradiation is continuously performed at a predetermined speed or more, a hole and a groove are temporarily formed in the surface of the metal molded body, but the hole and the groove are raised and covered by the melted metal and are blocked, with the result that the open hole 30, the inner space 40 and the open space 45 are formed.

Furthermore, in the same way, although the details of how the branch hole 33 of the open hole 30 and the tunnel connection path 50 are formed are not clear, it is considered that the side wall parts of the hole and the groove are melted by heat staying near the bottom portion of the hole and the groove temporarily formed, with the result that the branch hole 33 was formed by melting the inner wall of the stem hole 32, and furthermore, the tunnel connection path 50 is formed by extension of the branch hole 33.

Note that, when a pulse laser is used instead of the continuous-wave laser, in the joint surface of the metal molded body, the open hole and the groove are formed, but the inner space having no open portion and the connection path connecting the open hole and the inner space are not formed.

In the subsequent process, a portion of the metal molded body 10 including the roughened joint surface 12, and the resin molded body 20 are integrated.

In this process, any one of the following methods can be applied: a process of arranging, within a mold, a portion of the metal molded body including the joint surface irradiated with the laser light in the preceding process and performing injection molding of a resin forming the resin molded body; and a process of arranging, within a mold, a portion of the metal molded body including the joint surface irradiated with the laser light in the preceding step and performing compression molding in a state where at least the joint surface and a resin forming the resin molded body are made to contact with each other.

In addition, a known molding method which is used as a method of molding a thermoplastic resin or a thermosetting resin can be applied.

When a thermoplastic resin is used, there may be adopted a method in which the resin is allowed to enter the hole, the groove and the tunnel connection path formed in the metal molded body, by applying a pressure or the like to the molten resin and thereafter the composite molded body is obtained by cooling and solidifying the resin. A molding method such as injection compression molding can also be used in addition to injection molding and compression molding.

When a thermoplastic resin is used, there may be adopted a method in which the resin is allowed to enter the hole, the groove and the tunnel connection path formed in the metal molded body, by applying a pressure or the like to the resin in a liquid or molten state, and thereafter the composite molded body is obtained by heat-curing the resin. A molding method such as transfer molding can also be used in addition to injection molding and compression molding.

When a compression molding method is applied, there can be applied, for example, a method in which the metal molded body 10 is arranged in a state where the joint surface 12 is exposed to the interior of a mold frame (in a state where the joint surface is on the surface side), a thermoplastic resin, a thermoplastic elastomer or a thermosetting resin (however, a pre-polymer) is put into the mold frame and thereafter compression is performed.

Note that, when in an injection molding method or a compression molding method, a thermosetting resin (a pre-polymer) is used, thermosetting is performed by heating or the like in the subsequent process.

The resin of the resin molded body used in this process includes not only a thermoplastic resin and a thermosetting resin but also a thermoplastic elastomer.

The thermoplastic resin can be appropriately selected as necessary from known thermoplastic resins according to the intended use. Examples thereof can include a polyamide-based resin (an aliphatic polyamide such as PA6 and PA66 or an aromatic polyamide), a copolymer containing polystyrene units such as polystyrene, ABS resin and AS resin, a copolymer containing polyethylene and ethylene units, a copolymer containing polypropylene and propylene units, other polyolefins, polyvinyl chloride, polyvinylidene chloride, a polycarbonate-based resin, an acrylic resin, a methacrylic-based resin, a polyester-based resin, a polyacetal-based resin and a polyphenylene sulfide-based resin.

The thermosetting resin can be appropriately selected as necessary from known thermosetting resins according to the intended use. Examples thereof can include a urea resin, a melamine resin, a phenol resin, a resorcinol resin, an epoxy resin, polyurethane and vinyl urethane.

The thermoplastic elastomer can be appropriately selected as necessary from known thermoplastic elastomers according to the intended use. Examples thereof can include a styrene-based elastomer, a vinyl chloride-based elastomer, an olefin-based elastomer, a urethane-based elastomer, a polyester-based elastomer, a nitrile-based elastomer and a polyamide-based elastomer.

It is possible to blend known fibrous fillers with these thermoplastic resins, heat-curable resins and thermoplastic elastomers.

The known fibrous fillers can include a carbon fiber, an inorganic fiber, a metal fiber and an organic fiber.

The carbon fiber is the well-known fibrous filler, and PAN-based, pitch-based, rayon-based and lignin-based fibers can be used.

The inorganic fibers can include a glass fiber, a basalt fiber, a silica fiber, a silica-alumina fiber, a zirconia fiber, a boron nitride fiber, a silicon nitride fiber and the like.

The metal fibers can include fibers formed of stainless steel, aluminum, copper and the like.

Examples of the organic fibers that can be used include: synthetic fibers such as a polyamide fiber (a wholly aromatic polyamide fiber, or a semi-aromatic polyamide fiber in which either a diamine or a dicarboxylic acid is an aromatic compound and an aliphatic polyamide fiber), a polyvinyl alcohol fiber, an acrylic fiber, a polyolefin fiber, a polyoxymethylene fiber, a polytetrafluoroethylene fiber, a polyester fiber (including a wholly aromatic polyester fiber), a polyphenylene sulfide fiber, a polyimide fiber and a liquid crystalline polyester fiber; natural fibers (such as cellulose-based fibers); a regenerated cellulose (rayon) fiber; and the like.

Although the fibrous fillers having a fiber diameter within a range of 3 to 60 μm can be used, among them, for example, a fibrous filler having a fiber diameter smaller than the diameter of the opening of the open hole 30 or the like formed by roughening the joint surface 12 of the metal molded body 10 is preferably used. The fiber diameter is more preferably 5 to 30 μm and is further preferably 7 to 20 μm.

The above-described fibrous filler whose fiber diameter is smaller than the diameter of the opening of the open hole 30 is preferably used because when it is used, the composite molded body in which part of the fibrous filler tensionally enters the open hole 30 or the like of the metal molded body is obtained to increase the joining strength of the metal molded body and the resin molded body.

The blending amount of a fibrous filler relative to 100 mass parts of the thermoplastic resin, the thermosetting resin or the thermoplastic elastomer is preferably 5 to 250 mass parts. The blending amount is more preferably 25 to 200 mass parts, and is further preferably 45 to 150 mass parts.

The composite molded body 1 obtained by the manufacturing method of the present invention is integrated in a state where the resin forming the resin molded body 20 enters into the open hole 30 of the metal molded body 10 as shown in FIGS. 7 and 8, the inner space 40, the tunnel connection path 50 and the open space 45.

The resin enters the inside of the open hole 30 (the stem hole 32 and the branch hole 33) and the open space 45 through the opening parts thereof, and the resin entering through the opening portions of the open hole 30 and the open space 45 enters the inside of the inner space 40 through the tunnel connection path 50.

Accordingly, in the composite molded body 1 obtained by the manufacturing method of the present invention, both a shear joining strength (S1) when the resin molded body 20 is pulled in a parallel direction (the X direction of FIG. 1) in a state where, in FIG. 1, an end portion of the metal molded body 10 is fixed to the joint surface 12 of the metal molded body 10 and the resin molded body 20, and a tensile joining strength (S2) when the resin molded body 20 is pulled in a direction (the Y direction of FIG. 1) perpendicular to the joint surface 12 of the metal molded body 10 and the resin molded body 20 are increased as compared with the composite molded body in which the resin enters into only the open hole 30 and the open space 45.

EXAMPLES

Examples 1 to 6 and Comparative Examples 1 to 3

Figure 9:
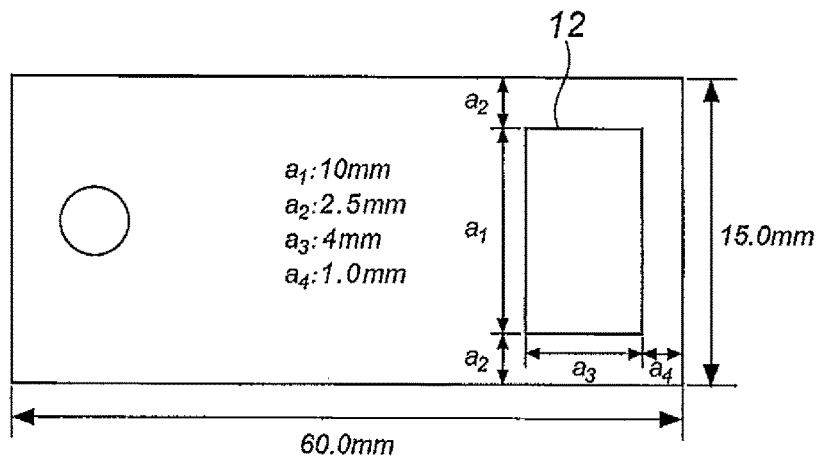
FIG. 9 is an illustrative diagram of a method of manufacturing a composite molded body when injection molding is performed.

In the Examples and Comparative Examples, the entire surface (an area size of 40 mm$^2$) of the joint surface 12 of a metal molded body (aluminum: A5052) shown in FIG. 9 was continuously irradiated with laser light under the conditions shown in Table 1.

In Examples 1 to 5 and Comparative Examples 1 to 3, as shown in FIG. 3, the laser light irradiation was continuously performed, and in Example 6, as shown in FIG. 4, the laser light irradiation was continuously performed.

Figure 17:
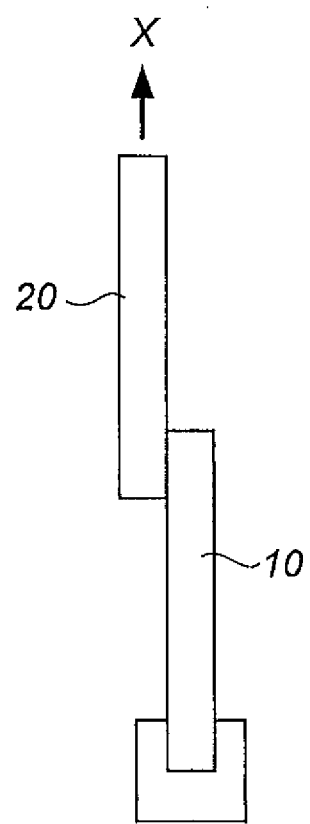
FIG. 17 is an illustrative diagram of a method of measuring a shear joining strength (SI) when pulled in a direction parallel to the joint surface.

Then, injection molding was performed by the following method through the use of the processed metal molded body, and a composite molded body shown in FIG. 17 in the Examples and Comparative Examples was obtained.

Figure 10:
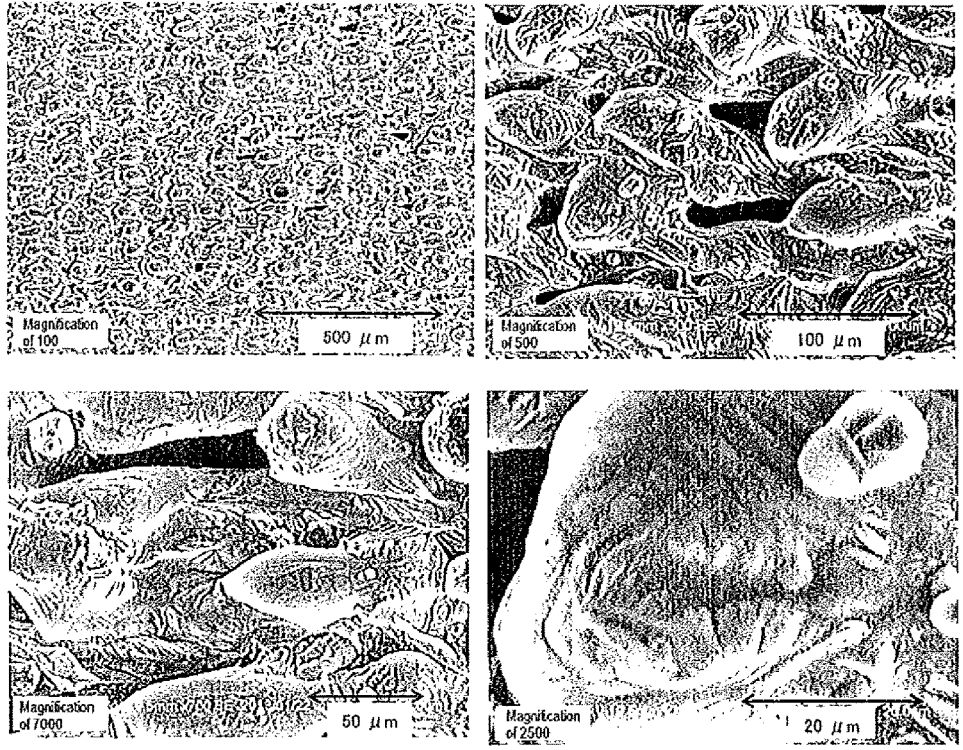
FIG. 10 is a SEM photograph of the surface of a metal molded body after laser irradiation is continuously performed in Example 1.

FIG. 10 a SEM photograph (a magnification of 100, a magnification of 500, a magnification of 700 and a magnification of 2500) of the joint surface of the metal molded body after the continuous irradiation with a continuous-wave laser in Example 1. It was able to be confirmed that the joint surface was roughened and that small concave portions were formed.

Figure 11:
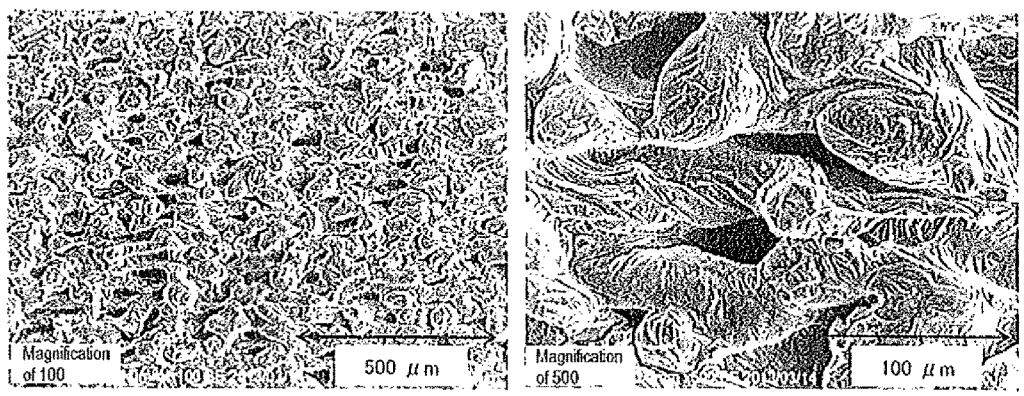
FIG. 11 is a SEM photograph of the joint surface of the metal molded body after laser irradiation is continuously performed in Example 2.

FIG. 11 a SEM photograph (a magnification of 100 and a magnification of 500) of the joint surface of the metal molded body after the continuous irradiation with the continuous-wave laser in Example 2. It was able to be confirmed that the joint surface was roughened and that small concave portions were formed.

Figure 12:
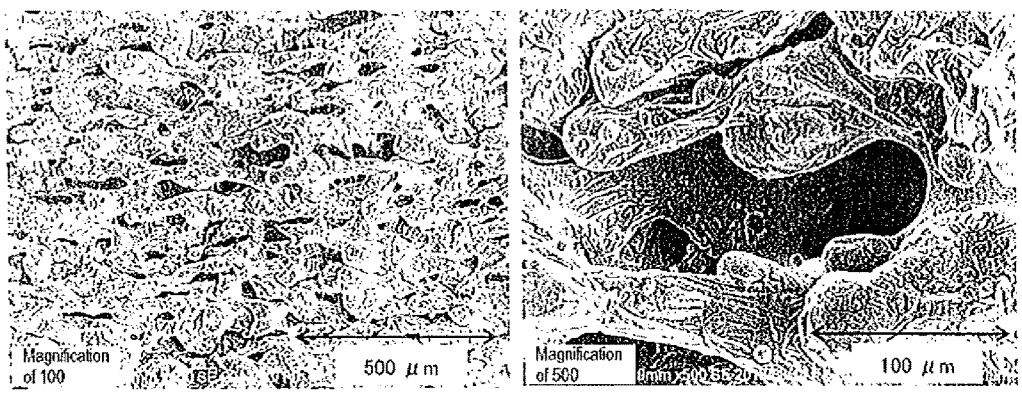
FIG. 12 is a SEM photograph of the joint surface of the metal molded body after laser irradiation is continuously performed in Example 3.

FIG. 12 a SEM photograph (a magnification of 100 and a magnification of 500) of the joint surface of the metal molded body after the continuous irradiation with the continuous-wave laser in Example 3. It was able to be confirmed that the joint surface was roughened and that small concave portions were formed.

Figure 13:
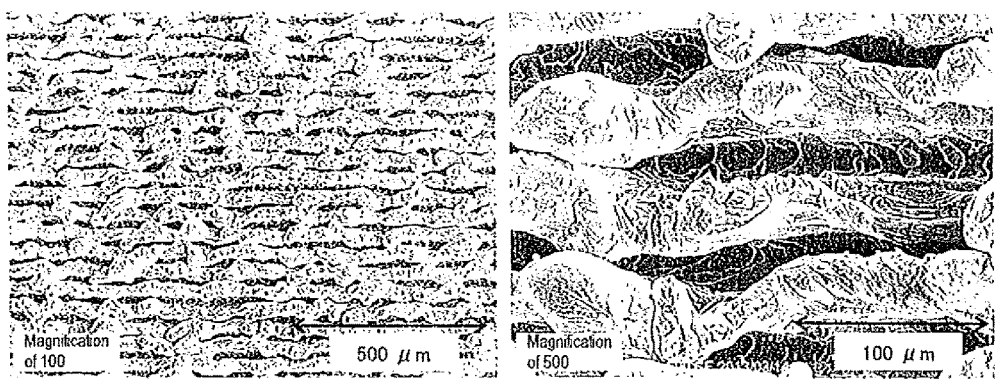
FIG. 13 is a SEM photograph of the joint surface of the metal molded body after laser irradiation is continuously performed in Example 4.

FIG. 13 a SEM photograph (a magnification of 100 and a magnification of 500) of the joint surface of the metal molded body after the continuous irradiation with the continuous-wave laser in Example 4. It was able to be confirmed that the joint surface was roughened and that small concave portions were formed.

Figure 14:
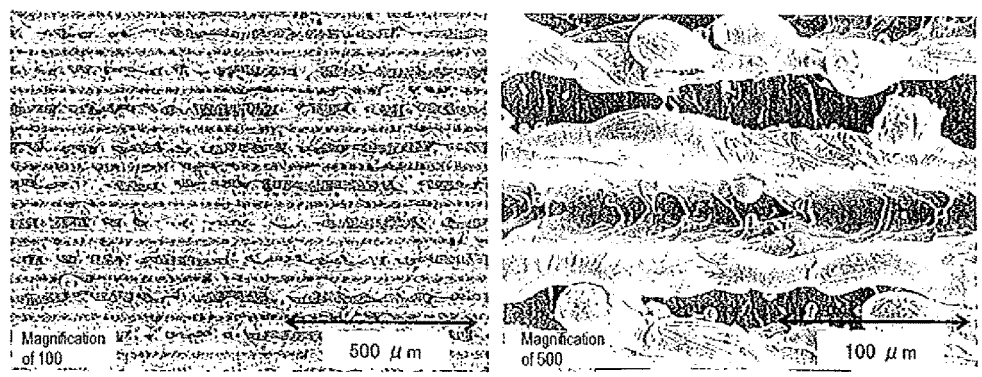
FIG. 14 is a SEM photograph of the joint surface of the metal molded body after laser irradiation is continuously performed in Example 5.

FIG. 14 a SEM photograph (a magnification of 100 and a magnification of 500) of the joint surface of the metal molded body after the continuous irradiation with the continuous-wave laser in Example 5. It was able to be confirmed that the joint surface was roughened and that small concave portions were formed.

tinuous-wave laser in Comparative Example 2. Since the irradiation speed was 1000 mm/sec, the joint surface was not sufficiently roughened.

<Injection Molding>

Resin: GF60% reinforced PA66 resin (PLASTRON PA66-GF60-01 (L7): manufactured by Daicel Polymer Co., Ltd.), the fiber length of the glass fiber: 11 mm Rein temperature: 320° C.
Mold temperature: 100° C.
Injection molding machine: ROBOSHOT S2000i100B manufactured by FANUC Corporation
Tensile Test The composite molded body shown in FIG. 17 in Examples and Comparative Examples was used, and the shear joining strength (S1) was evaluated by performing a tensile test. The results thereof are shown in Table 1.

In the tensile test, in a state where the end portion on the side of the metal molded body 10 was fixed, when the composite molded body was pulled in the X direction (the X direction of FIG. 1, the direction parallel to the joint surface 12) shown in FIG. 17 until the metal molded body 10 and the resin molded body 20 were broken, there was measured the maximum load until the joint surface 12 was broken.

<Tensile Test Conditions>

Test machine: Tensilon (UCT-1T) manufactured by Orientec Co., Ltd
Tensile speed: 5 mm/min
Distance between chucks: 50 mm

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Type of metal | Al | | | | | | Al | | |
| Type of resin | PA66(including GF) | | | | | | PA66 (including GF) | | |
| Joining method | Injection molding | | | | | | Injection molding | | |
| Laser oscillator | Fiber laser | | | | | | $YVO_4$ laser | Fiber laser | |
| Waveform | Continuous wave | Continuous wave | Continuous wave | Continuous wave | Continuous wave | Continuous wave | Pulse wave | Continuous wave | Continuous wave |
| Output (W) | 274 | 274 | 274 | 274 | 274 | 274 | 6 | 274 | 274 |
| Wavelength (nm) | 1070 | 1070 | 1070 | 1070 | 1070 | 1070 | 1064 | 1070 | 1070 |
| Pulse width (nsec) | — | — | — | — | — | — | 30 | — | — |
| Frequency (kHz) | — | — | — | — | — | — | 50 | — | — |
| Spot diameter (μm) | 11 | 11 | 11 | 11 | 11 | 11 | 30 | 11 | 11 |
| [Energy density (W/μm$^2$) | 2.8 | 2.8 | 2.8 | 2.8 | 2.8 | 2.8 | 0.0085 | 2.8 | 2.8 |
| Laser irradiation speed (mm/sec) | 10000 | 10000 | 10000 | 13333 | 13333 | 13333 | 500 | 1000 | 100 |
| Number of lines | 80 | 80 | 80 | 80 | 40 | 99 | 500 | 80 | 80 |
| Line distance (b1) (mm) | 0.05 | 0.05 | 0.05 | 0.05 | 0.1 | 0.03 | 0.008 | 0.05 | 0.05 |
| Line group distance (b2) (mm) | — | — | — | — | — | 0.06 | — | — | — |
| Number of times of repetition (times) | 1 | 3 | 10 | 1 | 1 | 3 | 1 | 1 | 1 |
| Processing area (mm$^2$) | 40 | 40 | 40 | 40 | 40 | 40 | 40 | 40 | 40 |
| Processing time (s) | 0.4 | 1 | 3 | 0.3 | 0.2 | 1.3 | 20 | 4 | 40 |
| Shear joining strength (MPa) | 5 | 18 | 25 | 8 | 12 | 29 | 3 | 0 | 0 |

Figure 15:
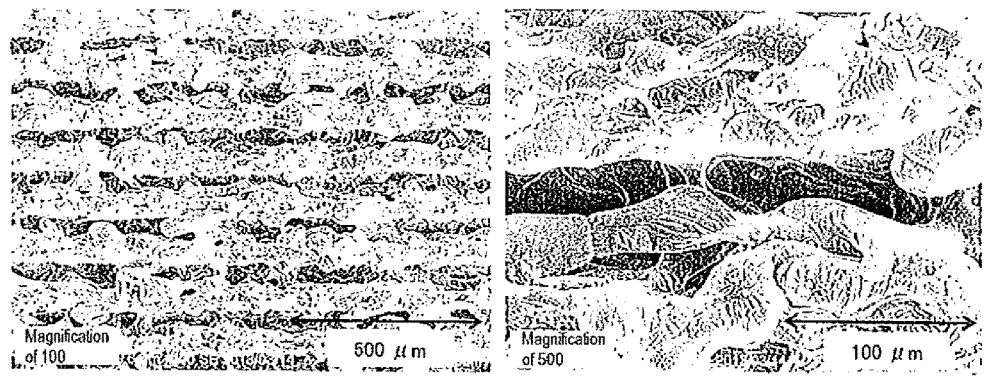
FIG. 15 is a SEM photograph of the joint surface of the metal molded body after laser irradiation is continuously performed in Example 6.

FIG. 15 a SEM photograph (a magnification of 100 and a magnification of 500) of the joint surface of the metal molded body after the continuous irradiation with the continuous-wave laser in Example 6. It was confirmed that the joint surface was roughened and that small concave portions were formed.

Figure 16:
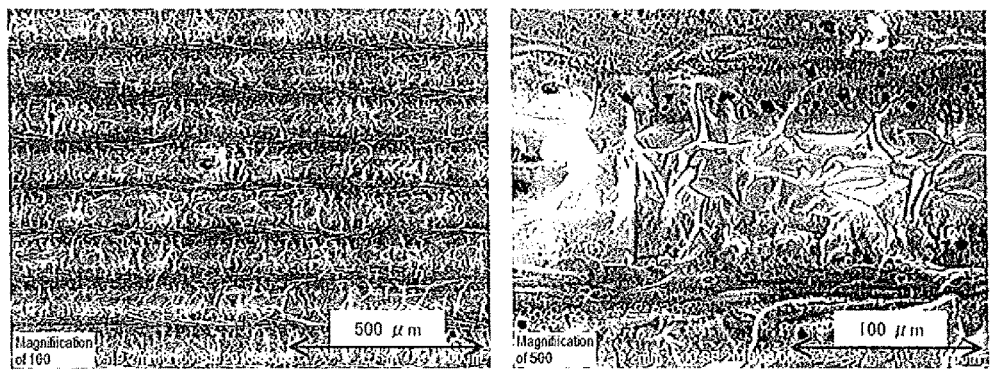
FIG. 16 is a SEM photograph of the joint surface of the metal molded body after laser irradiation is continuously performed in Comparative Example 2.

FIG. 16 a SEM photograph (a magnification of 100 and a magnification of 500) of the joint surface of the metal molded body after the continuous irradiation with the con- As can be confirmed from comparison between Example 1 and Comparative Example 1, in Example 1, the composite molded body having a higher joining strength was obtained in fiftieth of the processing time.

In consideration of mass production on an industrial scale, the industrial value of the manufacturing method in Example 1 of being able to reduce the processing time (namely, being able to reduce the energy required for manufacturing) is very high.

As can be confirmed from a comparison between Example 1 and Examples 2 and 3, as in Examples 2 and 3, the number of times the laser irradiation was repeated was increased, and thus the joining strength was able to be increased, with the result that, even in this case, the processing time was able to be reduced as compared with Comparative Examples 1 to 3.

As can be confirmed from a comparison between Examples 1 to 3 and Examples 4 to 6, when the laser irradiation speed was increased as in Examples 4 to 6, the shear joining strength (S1) (the joining strength in the X direction of FIGS. 1 and 17) was able to be increased.

Examples 7 to 9 and Comparative Examples 4 to 6

In the Examples and Comparative Examples, the entire surface (an area size of 90 mm$^2$) of the joint surface 12 of a metal molded body (aluminum: A5052) shown in FIG. 18 was continuously irradiated with laser light under the conditions shown in Table 2.

Figure 19:
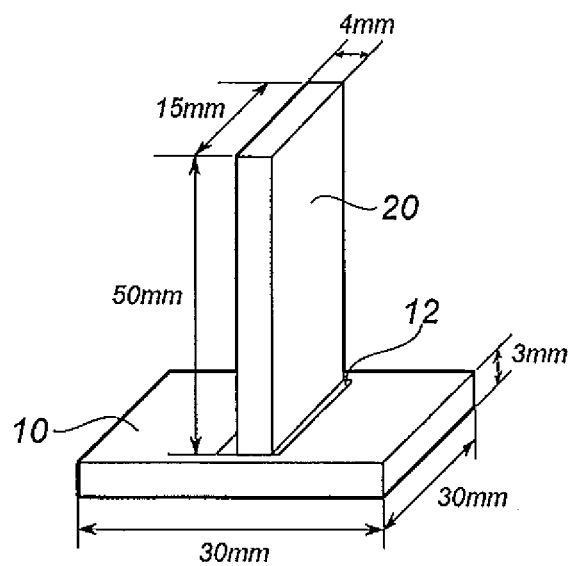
FIG. 19 is a perspective view of the manufactured composite molded body.

Thereafter, the composite molded body shown in FIG. 19 was obtained in the same way as in Examples 1 to 6 and Comparative Examples 1 to 3.

As to the obtained composite molded body, the tensile joining strength (S2) corresponding to the Y direction (the Y direction of FIG. 20) shown in FIG. 1 was measured by the following method.

Figure 20:
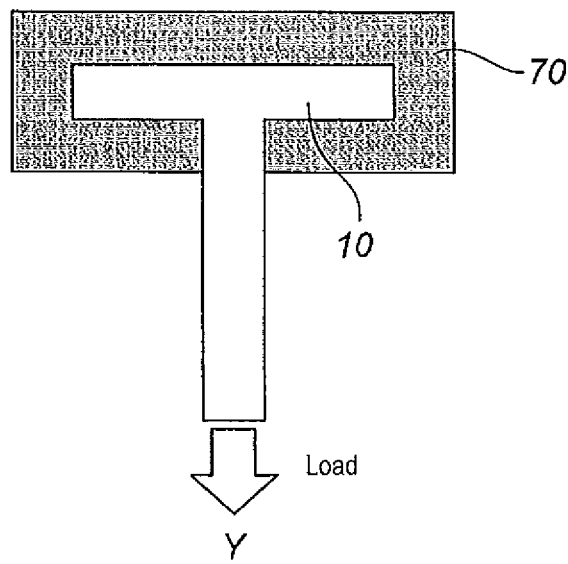
FIG. 20 is an illustrative diagram of a method of measuring a tensile joining strength (S2) of the composite molded body.

In the tensile test, as shown in FIG. 20, in a state where the side of the metal molded body 10 was fixed by a jig 70, when the composite molded body was pulled in the Y direction (the Y direction of FIG. 1, the vertical direction with respect to the joint surface 12) shown in FIG. 20 until the metal molded body 10 and the resin molded body 20 were broken, there was measured the maximum load until the joint surface 12 was broken.

<Tensile Test Conditions>
Test machine: Tensilon (UCT-1T) manufactured by Orientec Co., Ltd
  Tensile speed: 5 mm/min
  Distance between chucks: 50 mm Although Examples 7 to 9 (the area of the joint surface 12: 90 mm$^2$) in Table 2 correspond to Examples 1 to 3 (the area of the joint surface 12: 40 mm$^2$) in Table 1, the area of the joint surface 12 is 2.25 times that thereof.

However, as is clear from a comparison with Comparative Examples 4 to 6 in Table 2, it was able to be confirmed that the tensile joining strength (S2) when being pulled in a direction (the Y direction of FIG. 1) perpendicular to the joint surface 12 (the area of 90 mm$^2$) of the metal molded body 10 and the resin molded body 20 was also able to be increased by applying the manufacturing method of the present invention.

Examples 10 to 15 and Comparative Examples 7 to 9

In the Examples and Comparative Examples, the entire surface (an area size of 40 mm$^2$) of the joint surface 12 of a metal molded body (aluminum: A5052) shown in FIG. 21 was continuously irradiated with laser light under the conditions shown in Table 3.

In Examples 10 to 14 and Comparative Examples 8 and 9, as shown in FIG. 3, the laser light irradiation was continuously performed, in Example 15, as shown in FIG. 4, the laser light irradiation was continuously performed and in Comparative Example 7, as shown in FIG. 5, the laser light irradiation was continuously performed.

Then, compression molding was performed by the following method through the use of the processed metal molded body, and a composite molded body in the Examples and Comparative Examples was obtained.

<Compression Molding>

Figure 22:
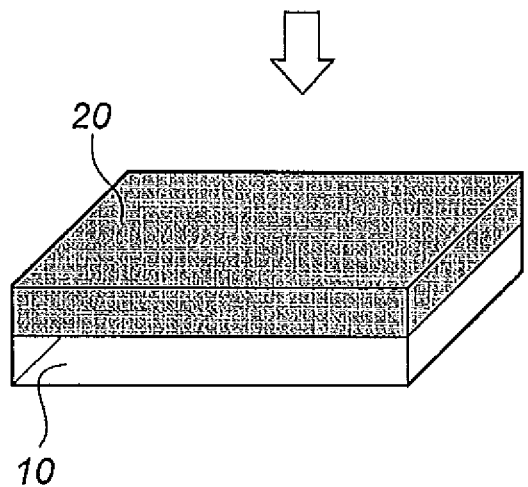
FIG. 22 is a perspective view of the composite molded body manufacturing by the compression molding.

The metal molded body 10 was arranged within the mold frame (made of Teflon) so that the joint surface 12 faces upward, and a resin pellet was added onto the joint surface 12. Thereafter, the mold frame was sandwiched by an iron plate and was compressed under the following conditions, and thus a composite molded body shown in FIG. 22 was obtained.

TABLE 2

|  | Example 7 | Example 8 | Example 9 | Comparative Example 4 | Comparative Example 5 | Comparative Example 6 |
| --- | --- | --- | --- | --- | --- | --- |
| Type of metal | Al | | | Al | | |
| Type of resin | PA66 (including GF) | | | PA66 (including GF) | | |
| Joining method | Injection molding | | | Injection molding | | |
| Laser oscillator | Fiber laser | | | YVO$_4$ laser | Fiber laser | |
| Waveform | Continuous wave | Continuous wave | Continuous wave | Pulse wave | Continuous wave | Continuous wave |
| Output (W) | 274 | 274 | 274 | 6 | 274 | 274 |
| Wavelength (nm) | 1070 | 1070 | 1070 | 1064 | 1070 | 1070 |
| Pulse width (nsec) | — | — | — | 30 | — | — |
| Frequency (kHz) | — | — | — | 50 | — | — |
| Spot diameter (μm) | 11 | 11 | 11 | 30 | 11 | 11 |
| Energy density (W/μm$^2$) | 2.8 | 2.8 | 2.8 | 2.8 | 2.8 | 2.8 |
| Laser irradiation speed (mm/sec) | 10000 | 10000 | 10000 | 500 | 1000 | 100 |
| Number of lines | 120 | 120 | 120 | 750 | 120 | 120 |
| Line distance (b1) (mm) | 0.05 | 0.05 | 0.05 | 0.008 | 0.05 | 0.05 |
| Line group distance (b2) (mm) | — | — | — | — | — | — |
| Number of times of repetition (times) | 1 | 3 | 10 | 1 | 1 | 1 |
| Processing area (mm$^2$) | 90 | 90 | 90 | 90 | 90 | 90 |
| Processing time (s) | 0.6 | 1.6 | 3 | 30 | 6 | 60 |
| Tensile joining strength (MPa) | 4 | 14 | 21 | 0 | 0 | 0 |

Resin pellet: PA66 resin (2015B manufactured by Ube Industries, Ltd.)
Temperature: 28 5° C.
Pressure: 1 MPa (at the time of preheating), 10 Mpa
Time: 2 minutes (at the time of preheating), 3 minutes
Molding machine: Toyo Seiki Seisakusho Ltd. compressor (mini test press-10)

Tensile Test

The tensile joining strength (S2) was evaluated through the use of the composite molded bodies in Examples and Comparative Examples and by performing a tensile test. The results thereof are shown in Table 3.

The tensile test was performed as follows.

Figure 23:
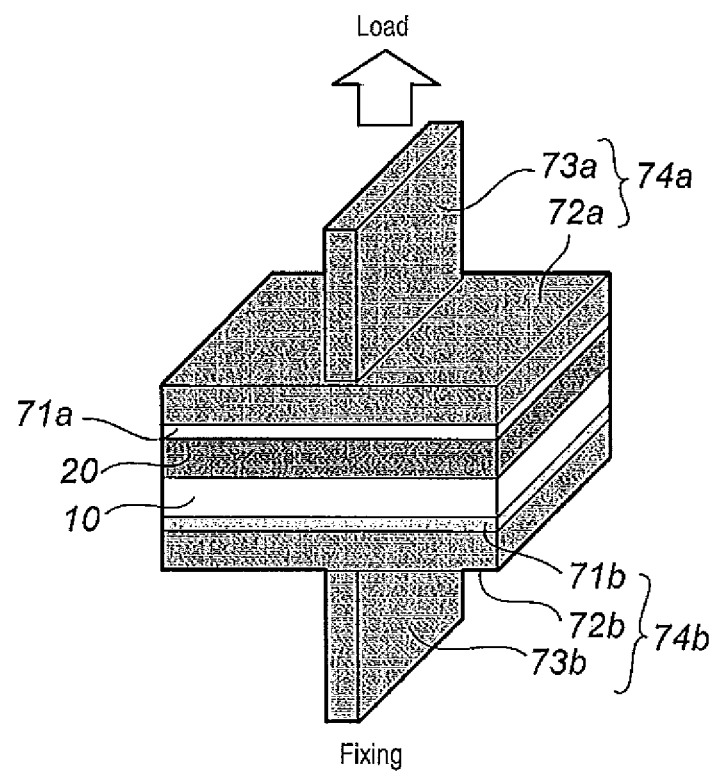
FIG. 23 is an illustrative diagram of a method of measuring the tensile joining strength (S2) when pulled in a direction perpendicular to the joint surface.

As shown in FIG. 23, a jig 74a formed of an aluminum plate 72a and a tensile portion 73a fixed in a direction perpendicular to the surface thereof was caused to adhere, with an adhesive 71a, to the exposed surface of the resin molded body 20 of the composite molded body.

In the same way, as shown in FIG. 23, a jig 74b formed of an aluminum plate 72b and a fixing portion 73b fixed in a direction perpendicular to the surface thereof was caused to adhere, with an adhesive 71b, to the exposed surface of the metal molded body 10 of the composite molded body.

In a state where the fixing portion 73b is fixed, there was measured the maximum load when the tensile portion 73a was pulled under the following conditions until the joint surface 12 was broken.

<Tensile Test Conditions>
Test machine: Tensilon
Tensile speed: 5 mm/min
Distance between chucks: 16 mm Method of Observing Inner Space The presence or absence of an inner space having no opening portion was checked. The method thereof will be described below.

In a joint portion of the composite molded body including the joint surface 12, three parts were randomly cut in a perpendicular direction (A-A, B—B and C-C directions in FIG. 6) of the laser irradiation, and the cross-sections of the surface parts thereof were randomly observed at three points, with a scanning electron microscope (SEM).

When the presence or absence of an inner space was able to be checked with a SEM observation photograph (magnification of 500), the number of inner spaces was counted. Note that inner spaces having a maximum diameter of 10 μm or less were omitted.

The number of inner spaces (the average value of those at 9 places) was shown (Table 3).

Furthermore, the inner space was analyzed by minute portion X ray analysis (EDX), and it was confirmed that the resin penetrated the inner space.

SEM: S-3400N manufactured by Hitachi High-Technologies Corporation

EDX analysis device: Apollo XP manufactured by AMETEK (formerly EDAX Japan) Co., Ltd.

Moreover, when, as shown in FIG. 2, the metal surface of the composite molded body is a curved surface, the same measurement can be performed by cutting the sample in a direction perpendicular to a tangent of the curved surface.

Note that, even by using a microscopic laser Raman spectrometer, it can be confirmed that the resin penetrates the inner space.

TABLE 3

|  | Example 10 | Example 11 | Example 12 | Example 13 | Example 14 | Example 15 | Comparative Example 7 | Comparative Example 8 | Comparative Example 9 |
|---|---|---|---|---|---|---|---|---|---|
| Type of metal |  |  |  | Al |  |  |  | Al |  |
| Type of resin |  |  |  | PA66 |  |  |  | PA66 |  |
| Joining method |  |  |  | Compression molding |  |  |  | Compression molding |  |
| Laser oscillator |  |  |  | Fiber laser |  |  |  | Fiber laser |  |
| Waveform | Continuous wave | Continuous wave | Continuous wave | Continuous wave | Continuous wave | Continuous wave | Pulse wave | Continuous wave | Continuous wave |
| Output (W) | 274 | 274 | 274 | 274 | 274 | 274 | 30 | 274 | 274 |
| Wavelength (nm) | 1070 | 1070 | 1070 | 1070 | 1070 | 1070 | 1070 | 1070 | 1070 |
| Pulse width (nsec) | — | — | — | — | — | — | 50 | — | — |
| Frequency (kHz) | — | — | — | — | — | — | 30 | — | — |
| Spot diameter (μm) | 11 | 11 | 11 | 11 | 11 | 11 | 45 | 11 | 11 |
| Energy density (W/μm$^2$) | 2.8 | 2.8 | 2.8 | 2.8 | 2.8 | 2.8 | 0.019 | 2.8 | 2.8 |
| Laser irradiation speed (mm/sec) | 10000 | 10000 | 10000 | 13333 | 13333 | 13333 | 500 | 1000 | 100 |
| Number of lines | 80 | 80 | 80 | 80 | 40 | 99 | 60 | 80 | 80 |
| Line distance (b1) (mm) | 0.05 | 0.05 | 0.05 | 0.05 | 0.1 | 0.03 | 0.06 | 0.05 | 0.05 |
| Line distance (b2) (mm) | — | — | — | — | — | 0.06 | 0.09 | — | — |
| Number of times of repetition (times) | 1 | 3 | 10 | 1 | 1 | 3 | 1 | 1 | 1 |
| Processing area (mm$^2$) | 40 | 40 | 40 | 40 | 40 | 40 | 40 | 40 | 40 |
| Processing time (s) | 0.4 | 1 | 3 | 0.3 | 0.2 | 1.3 | 1.2 | 4 | 40 |
| Inner space (pieces) | 5 | 7 | 6 | 3 | 2 | 3 | 0 | 0 | 0 |
| Tensile joining strength (MPa) | 19 | 21 | 28 | 18 | 16 | 22 | 1 | 0 | 0 |

Since in Examples 10 to 15, the joint surface 12 of the metal molded body 10 was continuously irradiated with laser light in the same way as in Examples 1 to 6, the surface of the joint surface 12 of the metal molded body 10 had the same SEM photographs (FIGS. 10 to 15) shown in Examples 1 to 6.

Figure 24:
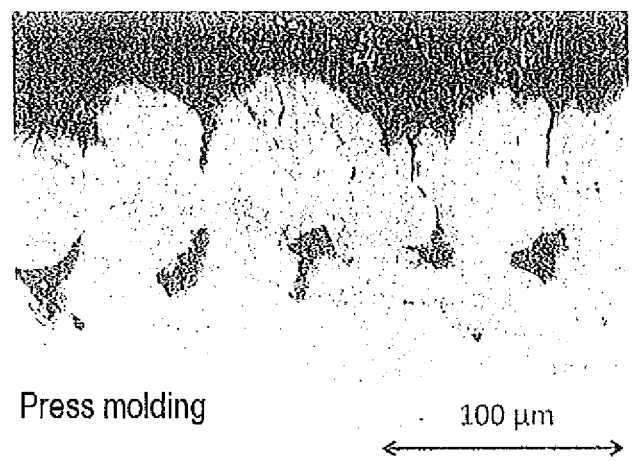
FIG. 24 is a SEM photograph of a cross-section, in a thickness direction, of the composite molded body obtained in Example 10.

FIG. 24 is a SEM photograph of a cross-section, in a thickness direction, the composite molded body in Example 10 (the cross-sectional views of A to C in FIG. 6).

A portion relatively appearing white was the metal molded body 10, and a portion relatively appearing black was the resin molded body 20.

A plurality of holes formed in the thickness direction, and a plurality of independent spaces were able to be confirmed from FIG. 24, and all of them appeared black, and thus it was able to be confirmed that the resin penetrated.

It was confirmed that the holes formed in the thickness direction were holes that correspond to the stem holes 32 of the open holes 30.

It was confirmed that the independent spaces are either the cross-sections of the branch holes 33 extended from the inner wall surface of the stem holes 32 in a direction different from the direction of formation of the stem holes 32, or the inner spaces 40.

Then, when the independent spaces were set to be the inner space 40, it is considered that, since the resin penetrated the interior, the inner spaces 40 are connected by the open hole 30 and the tunnel connection path 50.

Accordingly, the tensile joining strength (S2) when the composite molded body of Example 10 was pulled in a direction perpendicular to the joint surface 12 (the Y direction of FIG. 1) was increased.

Figure 25:
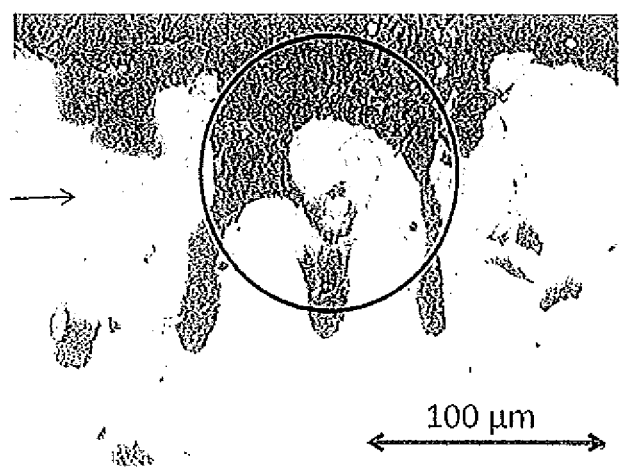
FIG. 25 is a SEM photograph of a cross-section, in the thickness direction, of the composite molded body obtained in Example 11.

FIG. 25 is a SEM photograph of a cross-section, in a thickness direction, the composite molded body in Example 11 (the cross-sectional views of A to C in FIG. 6).

A portion relatively appearing white was the metal molded body 10, and a portion relatively appearing black was the resin molded body 20.

A plurality of holes formed in the thickness direction, and a plurality of independent spaces were able to be confirmed from FIG. 25, and all of them appeared black, and thus it was able to be confirmed that the resin penetrated.

It was confirmed that the holes formed in the thickness direction were holes that correspond to the stem holes 32 of the open holes 30.

It was confirmed that the independent spaces are either the cross-sections of the branch holes 33 extended from the inner wall surface of the stem holes 32 in a direction different from the direction of formation of the stem holes 32, or the inner spaces 40.

Then, when the independent spaces were set to be the inner space 40, it is considered that, since the resin penetrated the interior, the inner spaces 40 are connected by the open hole 30 and the tunnel connection path 50.

Accordingly, the tensile joining strength (S2) when the composite molded body of Example 11 was pulled in a direction perpendicular to the joint surface 12 (the Y direction of FIG. 1) was increased.

Figure 26:
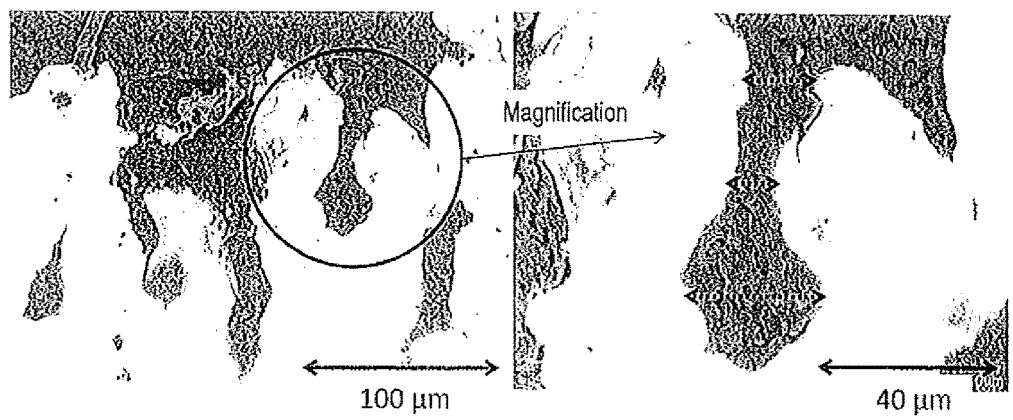
FIG. 26 is a SEM photograph of a cross-section, in the thickness direction, of the composite molded body obtained in Example 12.

FIG. 26 is a SEM photograph of a cross-section, in a thickness direction, the composite molded body in Example 12 (the cross-sectional views of A to C in FIG. 6).

A plurality of holes famed in the thickness direction, and a plurality of independent spaces were able to be confirmed from FIG. 26, and all of them appeared black, and thus it was able to be confirmed that the resin penetrated.

It was confirmed that the holes famed in the thickness direction were holes that correspond to the stem holes 32 of the open holes 30.

It was confirmed that the independent spaces are either the cross-sections of the branch holes 33 extended from the inner wall surface of the stem holes 32 in a direction different from the direction of formation of the stem holes 32, or the inner spaces 40.

Then, when the independent spaces were set to be the inner space 40, it is considered that, since the resin penetrates the interior, the inner spaces 40 are connected by the open hole 30 and the tunnel connection path 50.

Accordingly, the tensile joining strength (S2) when the composite molded body of Example 12 was pulled in a direction perpendicular to the joint surface 12 (the Y direction of FIG. 1) was increased.

Figure 27:
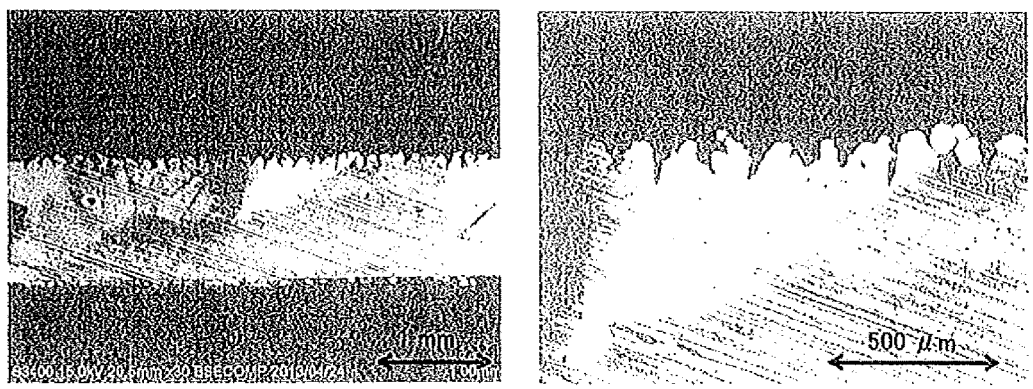
FIG. 27 is a SEM photograph of a cross-section, in the thickness direction, of the composite molded body obtained in Example 15.

FIG. 27 is a SEM photograph of a cross-section, in a thickness direction, of the composite molded body in Example 15.

Apart relatively appearing white was the metal molded body 10, and a part relatively appearing black was the resin molded body 20.

It was able to be confirmed that in the metal molded body 10, a large number of open holes 30 were formed.

Therefore, there was increased the tensile joining strength (S2) when the composite molded body of Example 15 was pulled in a direction perpendicular to the joint surface 12 (the Y direction of FIG. 1).

Examples 16 to 18

Figure 18:
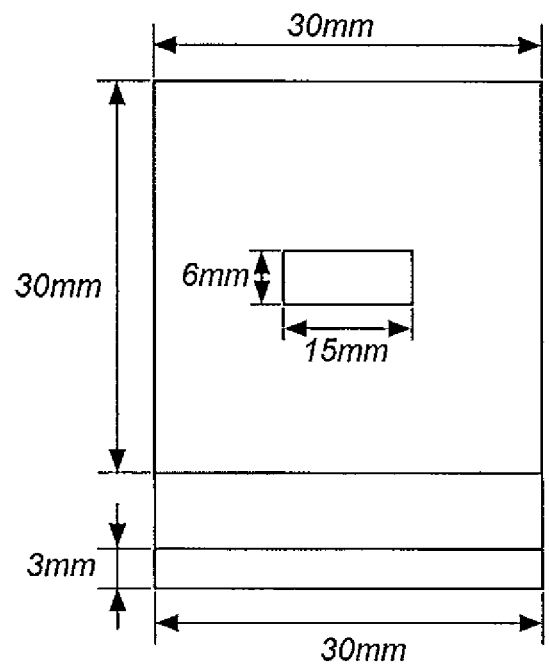
FIG. 18 is an illustrative diagram of a method of manufacturing a composite molded body when injection molding is performed.

In the same way as in Examples 7 to 9 (Table 2), the entire surface (an area size of 90 mm$^2$) of the joint surface 12 of a metal molded body (the metal shown in Table 4) shown in FIG. 18 was continuously irradiated with laser light under the conditions shown in Table 4.

Thereafter, the composite molded body shown in FIG. 19 was obtained in the same way as in Examples 1 to 6 and Comparative Examples 1 to 3.

As to the obtained composite molded body, the tensile joining strength (S2) corresponding to the Y direction (the Y direction of FIG. 20) shown in FIG. 1 was measured by the following method.

In the tensile test, as shown in FIG. 20, in a state where the side of the metal molded body 10 was fixed by a jig 70, when the composite molded body was pulled in the Y direction (the Y direction of FIG. 1, the vertical direction with respect to the joint surface 12) shown in FIG. 20 until the metal molded body 10 and the resin molded body 20 were broken, there was measured the maximum load until the joint surface 12 was broken.

<Tensile Test Conditions>

Test machine: Tensilon (UCT-1T) manufactured by Orientec Co., Ltd

Tensile speed: 5 mm/min Distance between chucks: 50 mm

Examples 19 to 21

Figure 21:
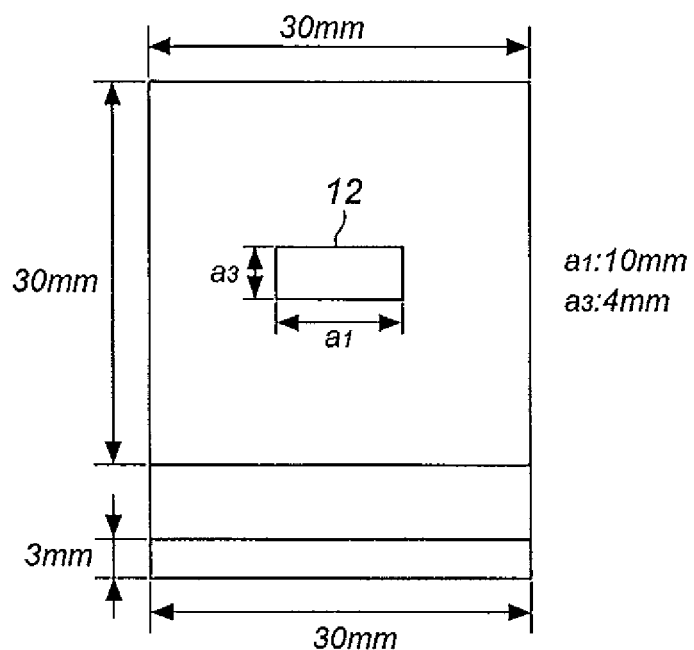
FIG. 21 is an illustrative diagram of a method of manufacturing the composite molded body when compression molding is performed.

The entire surface (an area size of 40 mm$^2$) of the joint surface 12 of a metal molded body (the metal shown in Table 4) shown in FIG. 21 was continuously irradiated with laser light under conditions shown in Table 4.

The laser light irradiation was continuously performed as shown in FIG. 3.

Then, compression molding was performed in the same way as in Examples 10 to 15, through the use of the processed metal molded body, and a composite molded body was obtained.

The tensile test and the method of observing the inner space were performed in the same way as in Examples 10 to 15.

TABLE 4

|  | Example 16 | Example 17 | Example 18 | Example 19 | Example 20 | Example 21 |
|---|---|---|---|---|---|---|
| Type of metal | Al | SUS304 | SUS304 | Al | SUS304 | SUS304 |
| Type of resin | PA66 (Including GF) | PA66 (Including GF) | PP (Including GF) | PA66 | PA66 | PA66 |
| Joining method | Injection molding | Injection molding | Injection molding | Compression molding | Compression molding | Compression molding |
| Laser oscillator | Fiber laser | Fiber laser | Fiber laser | Fiber laser | Fiber laser | Fiber laser |
| Waveform | Continuous wave | Continuous wave | Continuous wave | Continuous wave | Continuous wave | Continuous wave |
| Output (W) | 274 | 274 | 274 | 274 | 274 | 274 |
| Wavelength (nm) | 1070 | 1070 | 1070 | 1070 | 1070 | 1070 |
| Pulse width (nsec) | — | — | — | — | — | — |
| Frequency (kHz) | — | — | — | — | — | — |
| Spot diameter (μm) | 11 | 11 | 11 | 11 | 11 | 11 |
| Energy density (W/μm$^2$) | 2.8 | 2.8 | 2.8 | 2.8 | 2.8 | 2.8 |
| Laser irradiation speed (mm/sec) | 10000 | 7500 | 7500 | 10000 | 7500 | 10000 |
| Number of lines | 120 | 120 | 120 | 80 | 80 | 80 |
| Line distance (b1) (mm) | 0.05 | 0.05 | 0.05 | 0.05 | 0.05 | 0.05 |
| Line group distance (b2) (mm) | — | — | — | — | — | — |
| Number of times of repetition (times) | 30 | 10 | 10 | 30 | 10 | 10 |
| Processing area (mm$^2$) | 90 | 90 | 90 | 40 | 40 | 40 |
| Processing time (s) | 9 | 4 | 4 | 9 | 4 | 3 |
| Inner space (pieces) | — | — | — | 8 | 6 | 5 |
| Tensile joining strength (MPa) | 35 | 39 | 21 | 29 | 26 | 21 |

Figure 28:
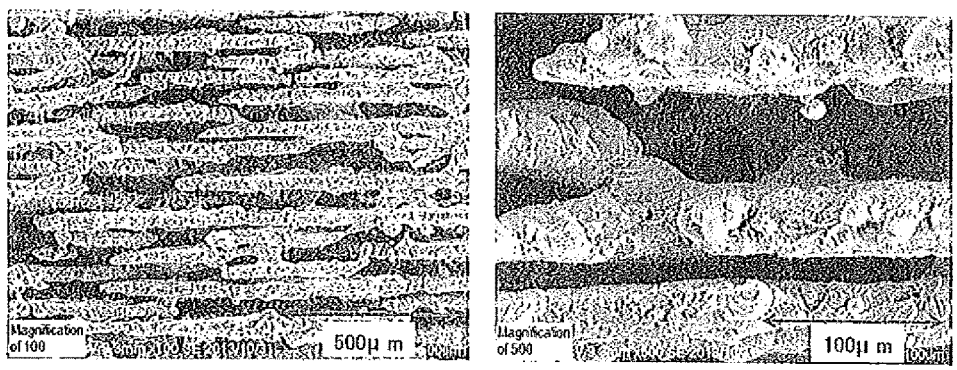
FIG. 28 is a SEM photograph of the joint surface of the metal molded body after laser irradiation is continuously performed in Example 16.
Figure 29:
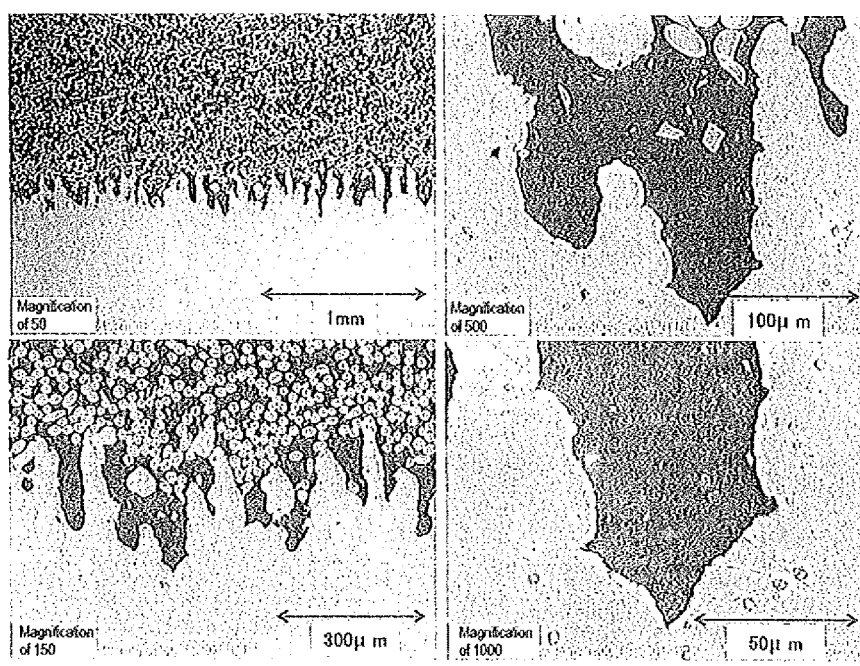
FIG. 29 is a SEM photograph of a cross-section, in the thickness direction, of the composite molded body obtained in Example 16.

In Example 16, since the number of times of repetition was larger than in Examples 7 to 9, the tensile joining strength (S2) was enhanced although the processing time was increased (FIGS. 28 and 29).

Figure 30:
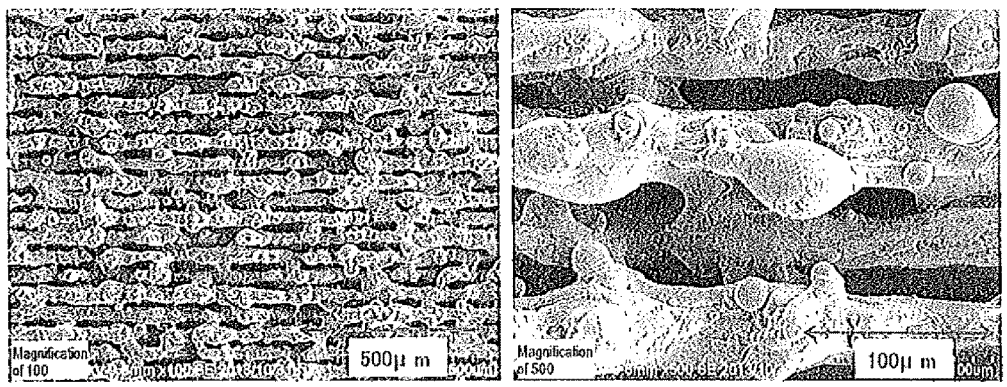
FIG. 30 is a SEM photograph of the joint surface of the metal molded body after laser irradiation is continuously performed in Example 17.

In Example 17 (SUS304), although as compared with example 9 (aluminum) in Table 2, the laser irradiation speed was decreased and the processing time was increased, the tensile joining strength (S2) was increased (FIG. 30).

In Example 18 (SUS304, PP including GF), as compared with Example 17 (SUS304, PA including GF), the tensile joining strength (S2) was lowered although the same conditions were used.

In Example 19, as compared with Examples 10 to 12 in Table 3, the number of times of repetition was large, and thus the tensile joining strength (S2) was increased although the processing time was increased.

Figure 31:
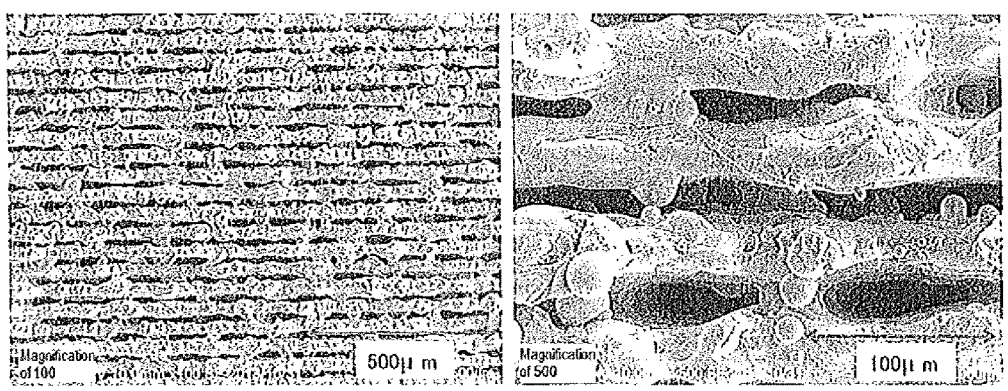
FIG. 31 is a SEM photograph of the joint surface of the metal molded body after laser irradiation is continuously performed in Example 21.

In Example 20 (SUS304) and Example 21 (SUS304; FIG. 31), as compared with Example 13 (aluminum) in Table 3, the laser irradiation speed was decreased and the number of times of repetition was increased, and thus the tensile joining strength (S2) was increased although the processing time was increased.

Example 1

Figure 32:
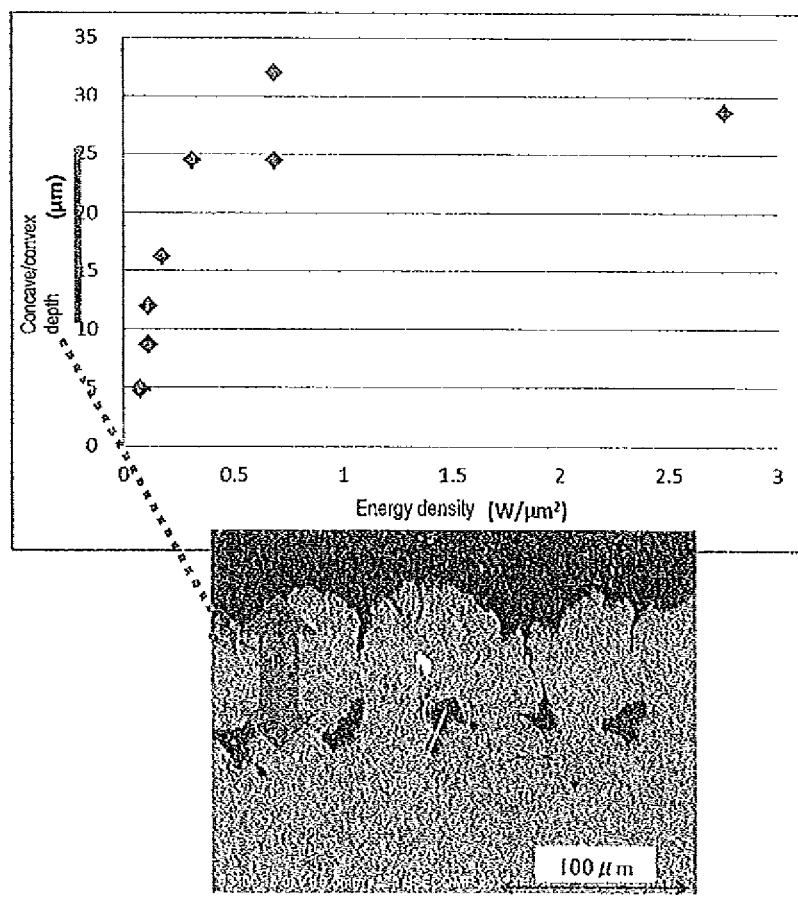
FIG. 32 is a graph showing a relationship between an energy density and a groove depth in Test Example 1 and a SEM photograph of a cross-section of the composite molded body in the thickness direction.
Figure 33:
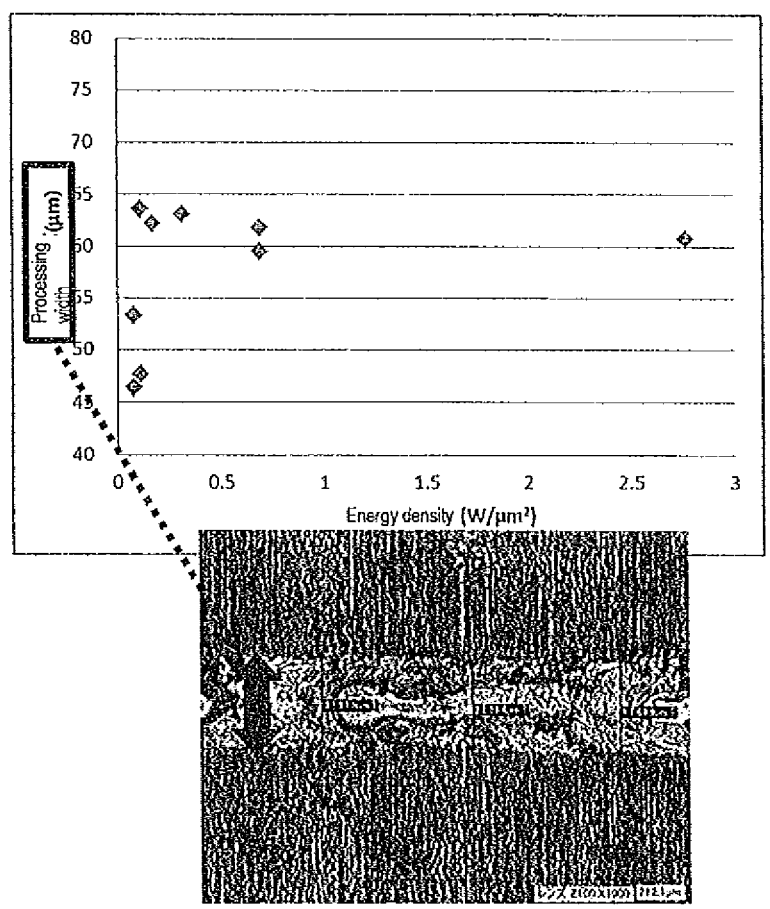
FIG. 33 is a graph showing a relationship between an energy density and a groove width in Test Example 1 and a SEM photograph of the joint surface of the metal molded body after laser irradiation is continuously performed.

In the same way as in Example 1, a relationship (FIG. 32) between the energy density and the depth of the groove when the surface of the aluminum was irradiated with the laser and a relationship (FIG. 33) between the energy density and the width of the groove were tested.

Consequently, a clear difference was confirmed in the energy density of approximately 0.3 W/μm$^2$.

Examples 22 to 35

In the same way as in Examples 7 to 9 (Table 2), the entire surface (an area size of 90 mm$^2$) of the joint surface 12 of a metal molded body (the metal shown in Table 5) shown in FIG. 18 was continuously irradiated with laser light under the conditions shown in Table 5.

Thereafter, the composite molded body shown in FIG. 19 was obtained in the same way as in Examples 1 to 6 and Comparative Examples 1 to 3.

As to the obtained composite molded body, the tensile joining strength (S2) corresponding to the Y direction (the Y direction of FIG. 20) shown in FIG. 1 was measured by the following method.

In the tensile test, as shown in FIG. 20, in a state where the side of the metal molded body 10 was fixed by a jig 70, when the composite molded body was pulled in the Y direction (the Y direction of FIG. 1, the vertical direction with respect to the joint surface 12) shown in FIG. 20 until the metal molded body 10 and the resin molded body 20 were broken, there was measured the maximum load until the joint surface 12 was broken.

<Tensile Test Conditions>

Test machine: Tensilon (UCT-1T) manufactured by Orientec Co., Ltd
Tensile speed: 5 mm/min
Distance between chucks: 50 mm

TABLE 5

|  | Examples | | | | | | | |
|---|---|---|---|---|---|---|---|---|
|  | 22 | 23 | 24 | 25 | 26 | 27 | 28 | 29 |
| Type of metal | SUS304 | | | | | | | |
| Type of resin | PA66 (including GF) | | | | | | | |
| Joining method | Injection molding | | | | | | | |
| Laser oscillator | Fiber laser | | | | | | | |
| Waveform | Continuous wave | | | | | | | |
| Output (W) | 274 | 274 | 274 | 274 | 274 | 274 | 274 | 274 |
| Wavelength (nm) | 1070 | 1070 | 1070 | 1070 | 1070 | 1070 | 1070 | 1070 |
| Spot diameter (μm) | 12 | 12 | 30 | 30 | 30 | 30 | 11 | 11 |

TABLE 5-continued

| | | | | | | | | |
|---|---|---|---|---|---|---|---|---|
| Energy density (W/μm$^2$) | 2.5 | 2.5 | 0.4 | 0.4 | 0.2 | 0.2 | 2.8 | 2.8 |
| Laser irradiation speed (mm/sec) | 10000 | 2000 | 10000 | 2000 | 10000 | 2000 | 7500 | 7500 |
| Number of lines | 120 | 120 | 120 | 120 | 120 | 120 | 120 | 120 |
| Line distance (b1) (mm) | 0.05 | 0.05 | 0.05 | 0.05 | 0.05 | 0.05 | 0.05 | 0.05 |
| Number of times of repetition (times) | 1 | 1 | 1 | 1 | 1 | 1 | 5 | 15 |
| Processing area (mm$^2$) | 90 | 90 | 90 | 90 | 90 | 90 | 90 | 90 |
| Processing time (s) | 0.6 | 3.0 | 0.6 | 3.0 | 0.6 | 3.0 | 2.0 | 6.0 |
| Tensile joining strength (MPa) | 36 | 10 | 26 | 3 | 8 | 8 | 38 | 44 |

| | Examples | | | | | |
|---|---|---|---|---|---|---|
| | 30 | 31 | 32 | 33 | 34 | 35 |
| Type of metal | Al (A5052) | | | Mg (AZ31) | | |
| Type of resin | PA66 (including GF) | | | PA66 (including GF) | | |
| Joining method | injection molding | | | Injection molding | | |
| Laser oscillator | Fiber laser | | | Fiber laser | | |
| Waveform | Continuous wave | | | Continuous wave | | |
| Output (W) | 274 | 274 | 274 | 274 | 274 | 274 |
| Wavelength (nm) | 1070 | 1070 | 1070 | 1070 | 1070 | 1070 |
| Spot diameter (μm) | 11 | 11 | 11 | 11 | 11 | 11 |
| Energy density (W/μm$^2$) | 2.8 | 2.8 | 2.8 | 2.8 | 2.8 | 2.8 |
| Laser irradiation speed (mm/sec) | 10000 | 10000 | 10000 | 10000 | 10000 | 10000 |
| Number of lines | 120 | 120 | 120 | 120 | 120 | 120 |
| Line distance (b1) (mm) | 0.05 | 0.05 | 0.05 | 0.05 | 0.05 | 0.05 |
| Number of times of repetition (times) | 15 | 20 | 25 | 1 | 3 | 5 |
| Processing area (mm$^2$) | 90 | 90 | 90 | 90 | 90 | 90 |
| Processing time (s) | 4.5 | 6.0 | 7.5 | 0.6 | 1.6 | 2.1 |
| Tensile joining strength (MPa) | 34 | 38 | 37 | 4 | 13 | 26 |

Examples 36 to 42

In the same way as in Examples 7 to 9 (Table 2), the entire surface (an area size of 90 mm$^2$) of the joint surface 12 of a metal molded body (the metal shown in Table 6) shown in FIG. 18 was continuously irradiated with laser light under the conditions shown in Table 6.

Thereafter, the composite molded body shown in FIG. 19 was obtained in the same way as in Examples 1 to 6 and Comparative Examples 1 to 3.

As to the obtained composite molded body, the tensile joining strength (S2) corresponding to the Y direction (the Y direction of FIG. 20) shown in FIG. 1 was measured by the following method.

In the tensile test, as shown in FIG. 20, in a state where the side of the metal molded body 10 was fixed by a jig 70, when the composite molded body was pulled in the Y direction (the Y direction of FIG. 1, the vertical direction with respect to the joint surface 12) shown in FIG. 20 until the metal molded body 10 and the resin molded body 20 were broken, there was measured the maximum load until the joint surface 12 was broken.

<Tensile Test Conditions>

Test machine: Tensilon (UCT-1T) manufactured by Orientec Co., Ltd

Tensile speed: 5 mm/min

Distance between chucks: 50 mm

TABLE 6

| | Examples | | | | | | |
|---|---|---|---|---|---|---|---|
| | 36 | 37 | 38 | 39 | 40 | 41 | 42 |
| Type of metal | Al (A5052) | | | | | | |
| Type of resin | PA66 (including GF) | | | | | | |
| Joining method | Injection molding | | | | | | |
| Laser oscillator | Fiber laser | | | | | | |
| Waveform | Continuous wave | | | | | | |
| Output (W) | 2000 | 2000 | 2000 | 2000 | 2000 | 2000 | 2000 |
| Wavelength (nm) | 1070 | 1070 | 1070 | 1070 | 1070 | 1070 | 1070 |
| Spot diameter (μm) | 21 | 47 | 47 | 80 | 80 | 80 | 80 |
| Energy density (W/μm$^2$) | 6.0 | 1.1 | 1.1 | 0.4 | 0.4 | 0.4 | 0.4 |
| Laser irradiation speed (mm/sec) | 4300 | 10000 | 6000 | 10000 | 6000 | 6000 | 6000 |
| Number of lines | 22 | 37 | 28 | 37 | 28 | 28 | 28 |
| Line distance (b1) (mm) | 0.27 | 0.16 | 0.21 | 0.16 | 0.21 | 0.21 | 0.21 |
| Number of times of repetition (times) | 1 | 1 | 1 | 1 | 1 | 3 | 10 |
| Processing area (mm$^2$) | 90 | 90 | 90 | 90 | 90 | 90 | 90 |
| Processing time (s) | 0.16 | 0.11 | 0.14 | 0.11 | 0.14 | 0.44 | 1.50 |
| Tensile joining strength (MPa) | 2 | 7 | 3 | 8 | 9 | 25 | 37 |

REFERENCE SIGNS LIST 1 composite molded body
10 metal molded body
12 joint surface
20 resin molded body

The invention claimed is:

1. A method of manufacturing a composite molded body in which a metal molded body and a resin molded body are joined, the method comprising the steps of: continuously irradiating a joint surface of the metal molded body with laser light at an output of 50-2500 W, an energy density (W/μm$^2$) determined from the laser output and the spot area ($\pi \times$[spot diameter/2]$^2$) is greater than 0.1 W/μm$^2$, and an irradiation speed of 2,000 mm/sec or more by using a continuous-wave laser; and arranging, within a mold, a portion of the metal molded body including the joint surface irradiated with the laser light in the preceding step and performing injection molding of a resin forming the resin molded body, wherein the step of continuously irradiating a joint surface of the metal molded body with laser light at an irradiation speed of 2,000 mm/sec or more is a step of continuously irradiating the laser light so as to form a plurality of straight lines, a plurality of curved lines or lines composed of combinations of these, and the laser light is continuously irradiated so as to form the plurality of straight lines or the plurality of curved lines, respectively, at equal intervals in a range of 0.005 to 1 mm.

2. The method of manufacturing a composite molded body, according to claim 1,
wherein the step of continuously irradiating a joint surface of the metal molded body with laser light at an irradiation speed of 2,000 mm/sec or more by using a continuous-wave laser is
a step of continuously irradiating the laser light so as to form a straight line, a curved line or a line composed of a combination of these, and one straight line or one curved line is formed by continuously irradiating the laser light a plurality of times.

3. The method of manufacturing a composite molded body, according to claim 1,
wherein the step of continuously irradiating a joint surface of the metal molded body with laser light at an irradiation speed of 2,000 mm/sec or more is
a step of continuously irradiating the laser light so as to form a plurality of straight lines, a plurality of curved lines or lines composed of combinations of these and
the laser light is continuously irradiated such that the plurality of straight lines or the plurality of curved lines are respectively formed at equal intervals in a range of 0.005 to 1 mm into one group, and a plurality of such groups are formed at equal intervals, with a spacing between the groups in a range of 0.01 to 1 mm.

4. The method of manufacturing a composite molded body, according to claim 1,
wherein the step of continuously irradiating the laser light is a step of continuously irradiating the laser light such that a processing time is in a range of 0.1 to 30 seconds when the following requirements (A) and (B) are satisfied:
(A) the irradiation speed of the laser light is 2,000 to 15,000 mm/sec; and
(B) the area of the joint surface of the metal molded body is 100 mm$^2$.

5. The method of manufacturing a composite molded body, according to claim 1,
wherein the step of continuously irradiating the laser light is a step of continuously irradiating the laser light such that:
the irradiation speed of the continuous-wave laser is 2,000 to 15,000 mm/sec;
the laser output is 250 to 2,000 W;
the laser beam diameter (spot diameter) is 10 to 100 μm; and
the energy density (W/μm$^2$) determined from the laser output and the spot area ($\pi \times$[spot diameter/2]$^2$) is in a range of 0.2 to 10 W/μm$^2$.

6. The method of manufacturing a composite molded body, according to claim 1,
wherein the joint surface of the metal molded body is a flat surface or a curved surface.

* * * * *